US012449965B2

(12) United States Patent
Seike

(10) Patent No.: US 12,449,965 B2
(45) Date of Patent: Oct. 21, 2025

(54) CONTENT MANAGEMENT DEVICE, CONTENT MANAGEMENT METHOD, AND COMPUTER-READABLE RECORDING MEDIUM

(71) Applicant: SHARP KABUSHIKI KAISHA, Osaka (JP)

(72) Inventor: Yohko Seike, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 287 days.

(21) Appl. No.: 18/234,054

(22) Filed: Aug. 15, 2023

(65) Prior Publication Data

US 2024/0078000 A1 Mar. 7, 2024

(30) Foreign Application Priority Data

Sep. 5, 2022 (JP) ................................ 2022-140602

(51) Int. Cl.
*G06F 9/30* (2018.01)
*G06F 3/04847* (2022.01)
*G06F 3/147* (2006.01)
*G09F 9/30* (2006.01)

(52) U.S. Cl.
CPC .......... *G06F 3/04847* (2013.01); *G06F 3/147* (2013.01); *G09F 9/30* (2013.01)

(58) Field of Classification Search
CPC .... G06F 3/04847; G06F 3/147; G06F 3/0482; G06F 3/04842; G06F 3/0488; G09F 9/30; G11B 27/105; G11B 27/34
See application file for complete search history.

(56) References Cited

U.S. PATENT DOCUMENTS

| | | | | |
|---|---|---|---|---|
| 5,940,776 A | * | 8/1999 | Baron | G01W 1/10 702/4 |
| 6,932,270 B1 | * | 8/2005 | Fajkowski | G07F 9/001 235/383 |
| 2004/0047589 A1 | * | 3/2004 | Kim | G11B 19/025 |
| 2004/0145462 A1 | * | 7/2004 | Ambrose | G09F 21/04 340/441 |
| 2008/0292272 A1 | * | 11/2008 | Yamazaki | H04N 21/47 386/E5.034 |

(Continued)

FOREIGN PATENT DOCUMENTS

JP 2015-070601 A 4/2015

*Primary Examiner* — Rinna Yi
(74) *Attorney, Agent, or Firm* — ScienBiziP, P.C.

(57) ABSTRACT

The content management device includes a content playback time adjacency determiner, a common scroll message setting operation acceptor, and a playback controller. The content playback time adjacency determiner determines whether playback times of a first piece of content and a second piece of content are adjacent. The operation acceptor accepts an operation to set a common scroll message that is the same for the first piece of content and the second piece of content when the playback times of the first piece of content and the second piece of content are determined to be adjacent by the adjacency determiner. The playback controller continuously plays back the common scroll message across the playback time of the first piece of content and the playback time of the second piece of content when the common scroll message is set to the first piece of content and the second piece of content.

15 Claims, 26 Drawing Sheets

(56) References Cited

U.S. PATENT DOCUMENTS

| | | | |
|---|---|---|---|
| 2009/0058680 A1* | 3/2009 | Benn | G09F 9/33 340/908 |
| 2011/0058106 A1* | 3/2011 | Bruna Estrach | G06T 7/238 348/E5.065 |
| 2012/0124625 A1* | 5/2012 | Foote | H04N 21/4828 725/53 |
| 2014/0040742 A1* | 2/2014 | Park | G06F 3/0484 715/719 |
| 2014/0334799 A1* | 11/2014 | Dhawan | H04N 21/2387 386/244 |
| 2015/0244656 A1* | 8/2015 | Choi | G06F 3/04842 709/206 |
| 2015/0319510 A1* | 11/2015 | Ould Dellahy, VIII | H04N 21/4725 725/32 |
| 2016/0196574 A1* | 7/2016 | Ganesh | G06Q 30/0246 705/14.45 |
| 2019/0012274 A1* | 1/2019 | Matsuda | H04W 4/12 |
| 2020/0097169 A1* | 3/2020 | Diaz | G06F 3/04817 |
| 2023/0153050 A1* | 5/2023 | Ikeda | G06F 3/14 715/732 |
| 2023/0217081 A1* | 7/2023 | Mou | H04N 21/43615 725/32 |

\* cited by examiner

FIG. 5

| NUMBER OF SECONDS | SIZE AND ORIENTATION OF SCROLL MESSAGE FRAME | ONE-BYTE/ TWO-BYTE | FONT | SPEED (1~10) | MAXIMUM NUMBER OF CHARACTERS TO BE DISPLAYED |
|---|---|---|---|---|---|
| 10 SECONDS | 1920x180 HORIZONTAL | TWO-BYTE | Arial, 72 | 5 | 23 |
| 10 SECONDS | 1920x180 HORIZONTAL | ONE-BYTE | Arial, 72 | 5 | 36 |
| 20 SECONDS | 1920x180 HORIZONTAL | TWO-BYTE | Arial, 72 | 5 | 46 |
| 20 SECONDS | 1920x180 HORIZONTAL | ONE-BYTE | Arial, 72 | 5 | 70 |
| 10 SECONDS | 1920x180 HORIZONTAL | TWO-BYTE | Arial, 72 | 10 | 97 |
| - | 1920x180 HORIZONTAL | TWO-BYTE | Arial, 72 | STOP | 21 |
| - | 1920x180 HORIZONTAL | ONE-BYTE | Arial, 72 | STOP | 34 |

CONTENT MANAGEMENT DEVICE, CONTENT MANAGEMENT METHOD, AND COMPUTER-READABLE RECORDING MEDIUM

INCORPORATION BY REFERENCE

This application claims priority under 35 U.S.C. 119 to Japanese Patent Application No. 2022-140602 filed on Sep. 5, 2022, the entire contents of which are incorporated herein by reference.

BACKGROUND

The present disclosure relates to a content management device, a content management method, and a computer-readable recording medium.

Recently, display devices that display pieces of content as images and moving scroll messages (for example, digital signage) have become popular. One signage system makes a time when a piece of content is displayed on a display device coincide with a time when a scroll message is displayed on the display device by adjusting a moving speed of the scroll message.

SUMMARY

According to a first aspect of the present disclosure, a content management device manages playback times of a plurality of pieces of content and manages scroll messages that are respectively set to the plurality of pieces of content and are played back simultaneously with playback of the pieces of content. The content management device includes a content playback time adjacency determiner, a common scroll message setting operation acceptor, and a playback controller. The content playback time adjacency determiner determines whether playback times of a first piece of content and a second piece of content are adjacent. The common scroll message setting operation acceptor accepts an operation to set a common scroll message common to the first piece of content and the second piece of content when the playback times of the first piece of content and the second piece of content are determined to be adjacent by the content playback time adjacency determiner. The playback controller continuously plays back the common scroll message across the playback time of the first piece of content and the playback time of the second piece of content when the common scroll message is set to the first piece of content and the second piece of content.

According to another aspect of the present disclosure, a content management method is a method for managing playback times of a plurality of pieces of content and managing scroll messages that are respectively set to the plurality of pieces of content and are played back simultaneously with playback of the pieces of content. The content management method includes a content playback time adjacency determining step, a common scroll message setting operation accepting step, and a playing back step. The content playback time adjacency determining step determines whether playback times of a first piece of content and a second piece of content are adjacent. The common scroll message setting operation accepting step accepts an operation to set a common scroll message common to the first piece of content and the second piece of content when the playback times of the first piece of content and the second piece of content are determined to be adjacent in the content playback time adjacency determining step. The playing back step continuously plays back the common scroll message across the playback time of the first piece of content and the playback time of the second piece of content when the common scroll message is set to the first piece of content and the second piece of content.

According to another aspect of the present disclosure, a computer-readable recording medium is a non-transitory computer-readable recording medium storing a content management program for causing a computer to execute processing for managing playback times of a plurality of pieces of content and managing scroll messages that are respectively set to the plurality of pieces of content and are played back simultaneously with playback of the pieces of content, and the processing includes: determining whether playback times of a first piece of content and a second piece of content are adjacent; accepting an operation to set a common scroll message common to the first piece of content and the second piece of content when the playback times of the first piece of content and the second piece of content are determined to be adjacent in the determining; and continuously playing back the common scroll message across the playback time of the first piece of content and the playback time of the second piece of content when the common scroll message is set to the first piece of content and the second piece of content.

BRIEF DESCRIPTION OF THE DRAWINGS

FIG. 5 is a table defining specifications of scroll messages according to the first embodiment.

DETAILED DESCRIPTION

Figure 1:
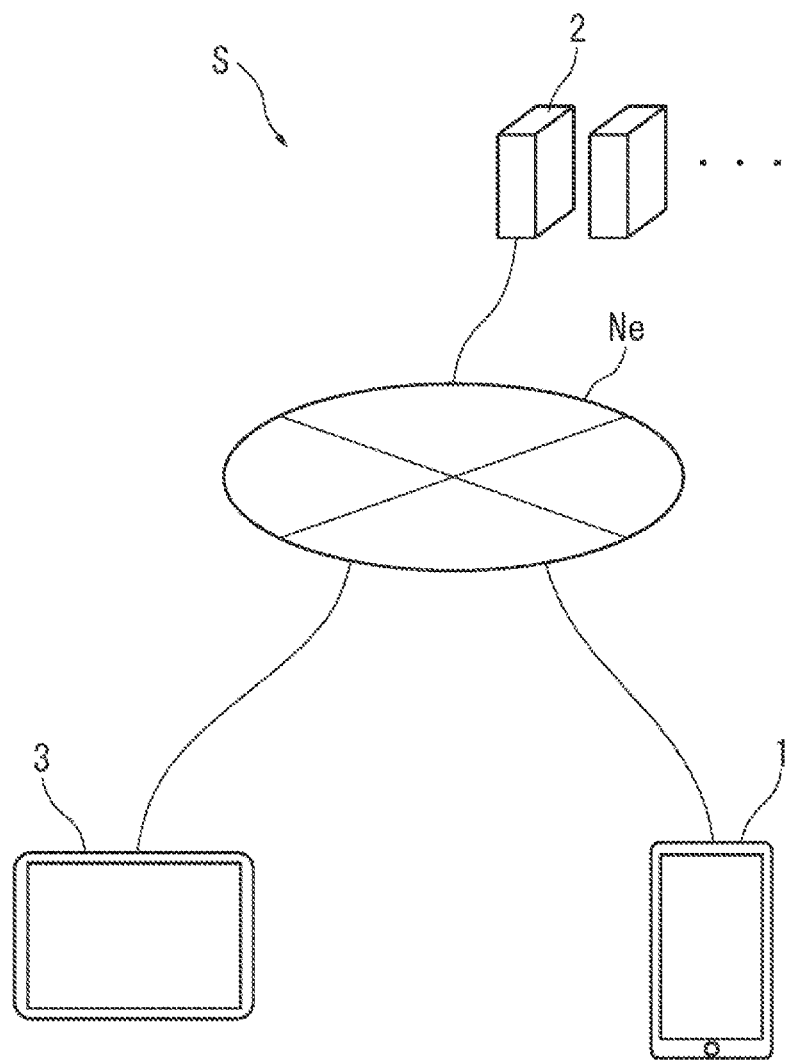
FIG. 1 is a diagram illustrating a configuration of a signage system according to a first embodiment of the present disclosure.

An embodiment of the present disclosure will be described with reference to the drawings. In the drawings, the same or corresponding parts are denoted with the same reference signs, and the description thereof is not repeated.

First Embodiment

With reference to FIG. 1, a signage system S will be described. FIG. 1 is a diagram illustrating a configuration of the signage system S. The signage system S is introduced in, for example, a relatively large shopping mall, a transportation system, or a small store. The signage system S is an example of a "content management system".

As illustrated in FIG. 1, the signage system S includes a display data creation device 1, a content management device 2, and a display device 3. In FIG. 1, a communication terminal owned by an operator is illustrated as the display data creation device 1. However, the display data creation device 1 may be a tablet, a laptop information processing device, or a desktop information processing device instead of the communication terminal, and the form of the display data creation device 1 is not particularly limited. The content management device 2 is, for example, a signage server. The content management device 2 functions as a web server. In the following embodiment, the display data creation device 1 is referred to as a communication terminal 1, and the content management device 2 is referred to as a server 2.

The communication terminal 1, the server 2, and the display device 3 are communicably connected to each other through a network Ne. The network Ne is, for example, the Internet, a local area network (LAN), or a wide area network (WAN). Various communication equipment is connected to the network Ne. Examples of the various communication equipment include a router, a bridge, an access point, a hub, and a repeater.

The communication terminal 1 accepts a display command. The display command is generated by an operation by the operator. The display command is a command signal to display content and a scroll message on the display device 3. The scroll message moves within a scroll message display frame when being displayed together with the content. The communication terminal 1 sends the display command to the server 2 on the basis of an operation by the operator. For each piece of the content, a dedicated scroll message corresponding to each piece of the content is preallocated. The dedicated scroll message preallocated to each piece of the content is hereinafter referred to as an allocated scroll message.

The display command is, for example, a command of a schedule and a playlist. The schedule and the playlist include, for example, information on a playback time of the content, a change in the playback time of the content, a playback order of the content, and a change in the playback order of the content. In other words, information regarding the schedule and the playlist is signage data. The server 2 obtains the display command sent by the communication terminal 1. The server 2 sends information regarding the content and the scroll message to the display device 3 according to the display command.

The display device 3 receives the information regarding the content and the scroll message from the server 2. The display device 3 displays the substance of the content and the scroll message, for example, an image, on the basis of the received information. The display device 3 is placed in various locations, for example, in a station concourse, at a bus stop, on an interior wall of a public facility, or on an exterior wall of a building facing a street. In the signage system S, there may be a single display device 3 or a plurality of display devices 3.

Figure 2:
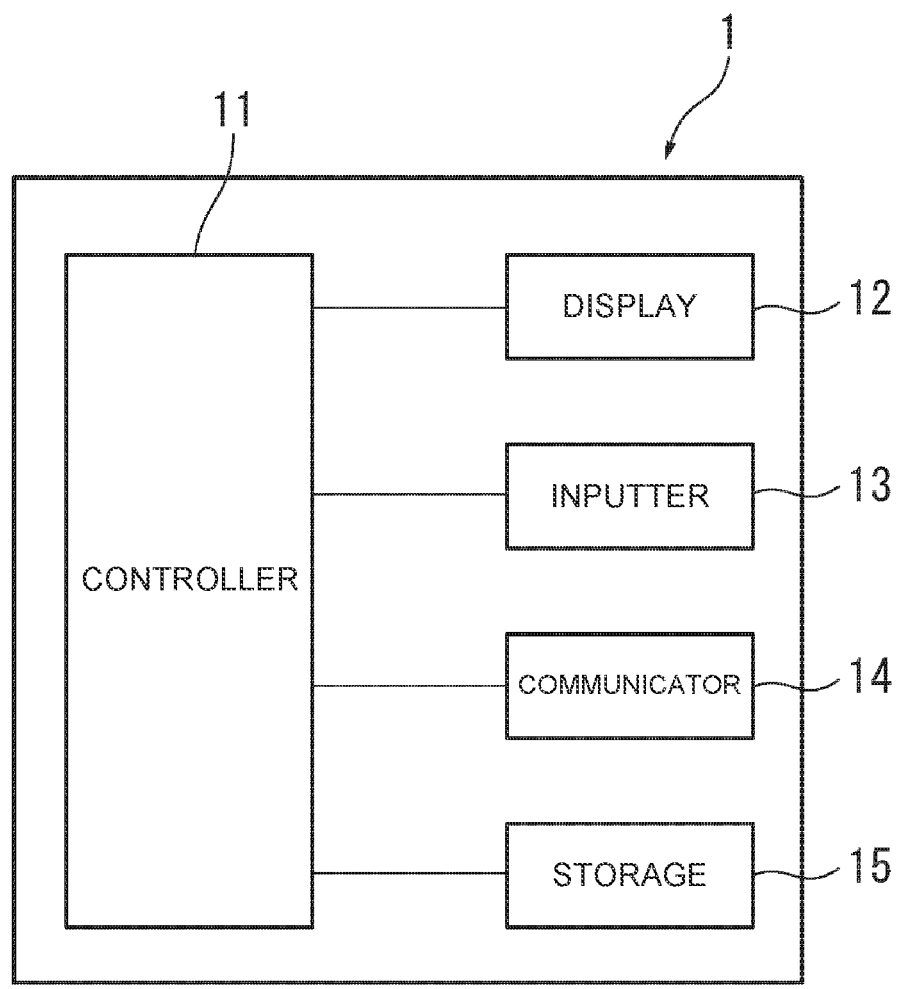
FIG. 2 is a block diagram of a communication terminal according to the first embodiment.

Next, with reference to FIG. 2, the communication terminal 1 will be described. FIG. 2 is a block diagram of the communication terminal 1. As illustrated in FIG. 2, the communication terminal 1 includes a controller 11, a display 12, an inputter 13, a communicator 14, and a storage 15.

The controller 11 includes a processor such as a central processing unit (CPU) or a micro processing unit (MPU). The processor of the controller 11 controls the display 12, the inputter 13, the communicator 14, and the storage 15 by executing a computer program stored in a storage device of the storage 15. The processor corresponds to an example of a "computer".

The display 12 is, for example, a liquid crystal display (LCD). The display 12 displays various images. As described below, the display 12 includes an apply button 121 and a cancel button 122. The apply button 121 sends the display command set on the basis of an operation of the inputter 13 (touch panel) to the server 2. The cancel button 122 disables the display command set on the basis of the operation of the inputter 13.

The inputter 13 includes, for example, a touch panel provided on the display 12. The communication terminal 1 may include operation keys. The operation keys also include an input device such as a mouse and/or a keyboard (both are not illustrated).

The communicator 14 communicates wirelessly with the server 2 via, for example, the network Ne. The communicator 14 is a wireless LAN module (communication equipment). The communicator 14 may be connected by wire to the server 2 to perform wire communication. The communicator 14 may also communicate wirelessly with the server 2 via Bluetooth (registered trademark). The communicator 14 sends the display command set by the operator to the server 2.

The storage 15 includes the storage device and stores a computer program such as software and various data. Specifically, the storage 15 includes a main storage device (for example, semiconductor memory) such as a read only memory (ROM) or a random access memory (RAM) and an auxiliary storage device such as a solid state drive and/or a hard disk drive. The storage 15 may include a removable medium. The storage 15 is an example of a storage medium (for example, non-transitory computer-readable storage medium).

Figure 3:
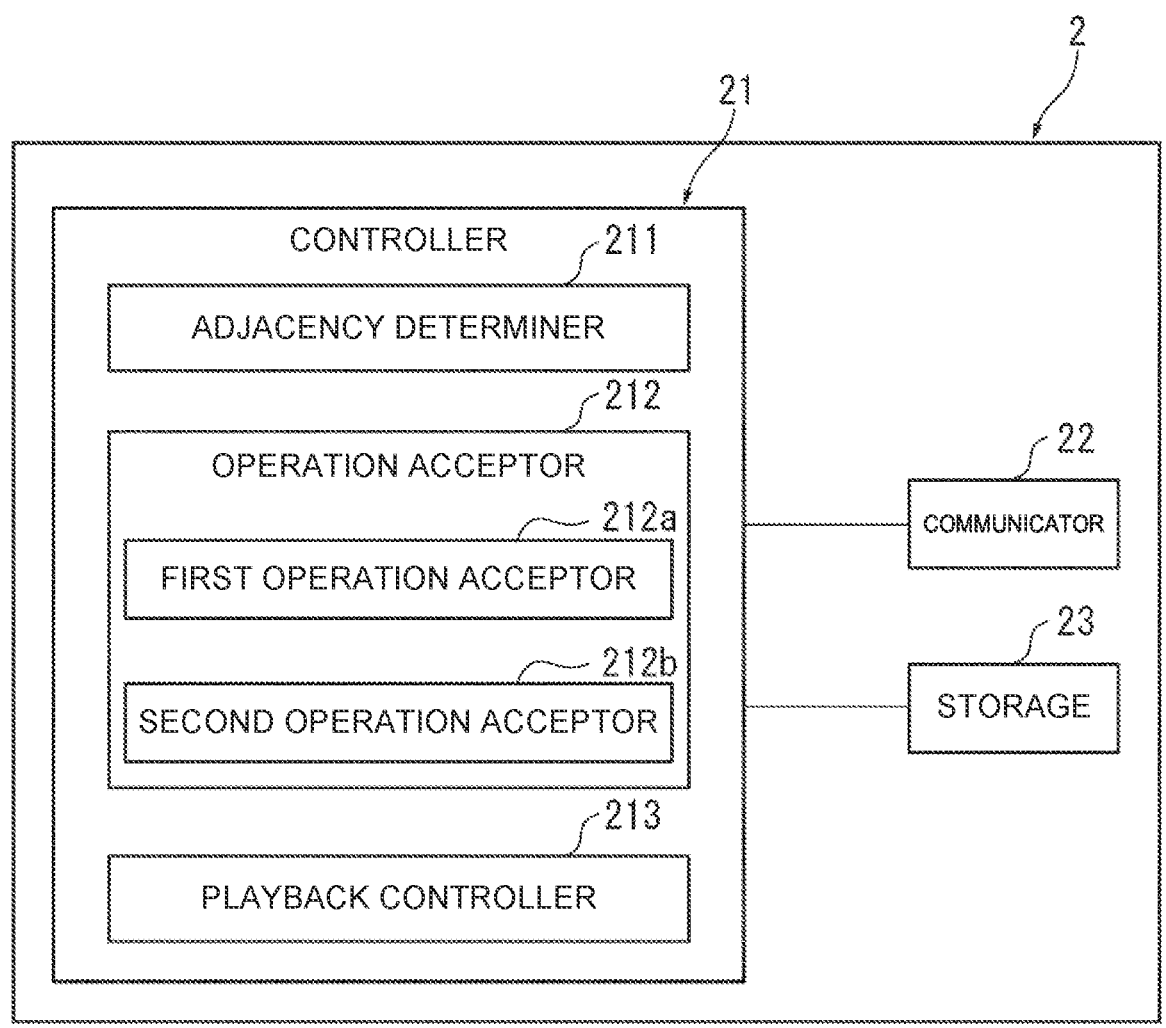
FIG. 3 is a block diagram of a server according to the first embodiment.

Next, with reference to FIG. 3, the server 2 will be described. FIG. 3 is a block diagram of the server 2. The server 2 manages playback times of a plurality of pieces of content. The server 2 manages scroll messages. The scroll messages are respectively set to the plurality of pieces of content and are played back simultaneously with playback of the pieces of content. In other words, the server 2 plays back the scroll messages according to the schedule and the playlist as well as the pieces of content. As illustrated in FIG. 3, the server 2 includes a controller 21, a communicator 22, and a storage 23.

The hardware configuration of the communicator 22 is the same as the hardware configuration of the communicator 14 of the communication terminal 1. The communicator 22 communicates wirelessly with the communication terminal 1 and the display device 3 via, for example, the network Ne. The communicator 22 receives the display command from, for example, the communication terminal 1. In other words, the communicator 22 receives the information regarding the schedule and the playlist (signage data) from the communication terminal 1.

The hardware configuration of the storage 23 is the same as the hardware configuration of the storage 15 of the communication terminal 1. The storage 23 stores, for example, a computer program and various data. The storage 23 stores, for example, information on the plurality of pieces of content, information on allocated scroll messages allocated to the respective pieces of content, and the display command received by the communicator 22. In other words, in addition to the pieces of content and the scroll messages, the storage 23 stores the information regarding the schedule and the playlist received by the communicator 22.

Figure 4:
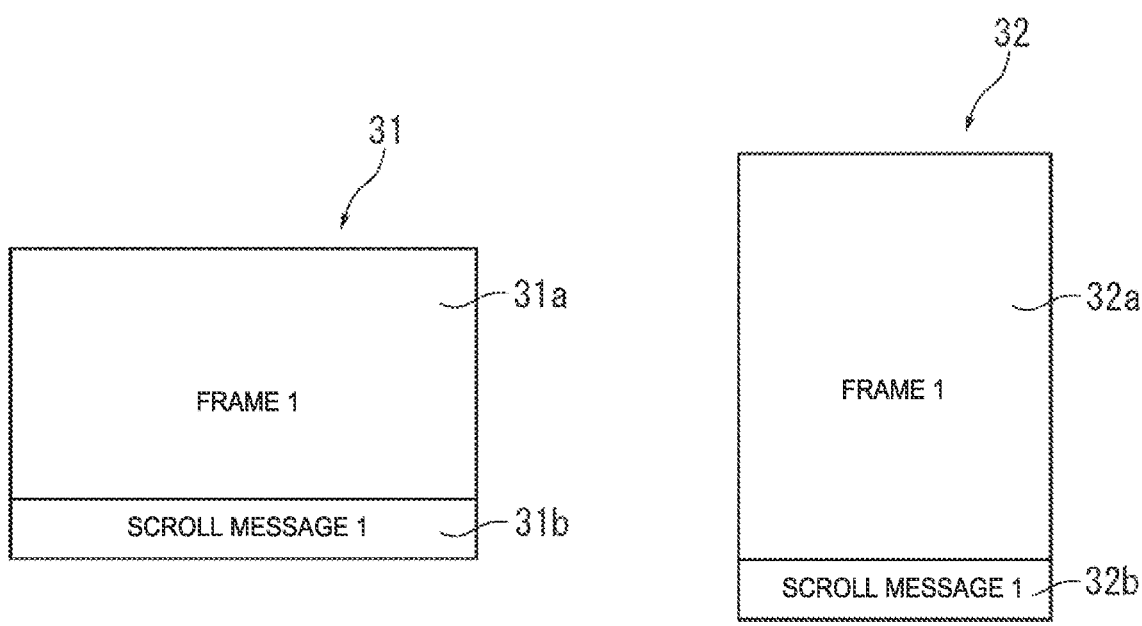
FIG. 4 is a diagram illustrating a content display frame and a scroll message display frame according to the first embodiment.

The storage 23 has information on dimensions of a content display frame and a scroll message display frame for each type of the display device 3. FIG. 4 is a diagram illustrating a content display frame and a scroll message display frame. As illustrated in FIG. 4, for example, the storage 23 has information on a content display frame 31*a* and a scroll message display frame 31*b* in the case of a horizontally oriented display device 31 and has information on a content display frame 32*a* and a scroll message display frame 32*b* in the case of a vertically oriented display device 32.

The storage 23 has a table T. FIG. 5 is a table T defining specifications of scroll messages. As illustrated in FIG. 5, specifications of scroll messages allocated to the respective pieces of content are predefined in the table T. The specifications of scroll messages are a display time, a size and an orientation of a scroll message display frame, one-byte/two-byte, a font, a speed, and the maximum number of characters to be displayed.

Next, the controller 21 will be described. The controller 21 includes a processor such as a CPU. The processor of the controller 21 controls the communicator 22 and the storage 23 by executing a computer program stored in a storage device of the storage 23.

Moreover, the processor of the controller 21 generates a schedule for playing back content and a scroll message by executing the computer program stored in the storage 23. The schedule indicates an expected playback time when the content and the scroll message are to be displayed on the display device 3. Then, the controller 21 stores the schedule in the storage 23. The schedule is generated, for example, on the basis of information set by the operator via the inputter 13 of the communication terminal 1.

The communicator 22 sends the information on the content and the scroll message stored in the storage 23 to the display device 3. The information on the content and the scroll message is sent, for example, in the playlist order at the time of the schedule. The display device 3 plays back the content and the scroll message on the basis of the received information on the content and the scroll message.

The controller 21 includes a content playback time adjacency determiner 211, a common scroll message setting operation acceptor 212, and a playback controller 213. Hereinafter, the content playback time adjacency determiner 211 is referred to as an adjacency determiner 211, and the common scroll message setting operation acceptor 212 is referred to as an operation acceptor 212.

The adjacency determiner 211 determines whether playback times of a first piece of content and a second piece of content are adjacent. Specifically, the adjacency determiner 211 determines whether the playback times of the first piece of content and the second piece of content are adjacent on the basis of a playlist. The operation acceptor 212 accepts an operation to set a common scroll message common to the first piece of content and the second piece of content. The operation acceptor 212 accepts the operation to set the common scroll message when the playback times of the first piece of content and the second piece of content are determined to be adjacent by the adjacency determiner 211. Therefore, it is possible to determine whether the same scroll message is set to adjacent pieces of content. As a result, the common scroll message can be set to the adjacent pieces of content. The adjacency of the playback times of the first piece of content and the second piece of content means that the first piece of content and the second piece of content are adjacent in the playlist. In the following description, a first piece of content, a second piece of content, and a third piece of content are sometimes used as generic terms for independent general pieces of content to be controlled.

The playback controller 213 continuously plays back the common scroll message across the playback time of the first piece of content and the playback time of the second piece of content when the common scroll message is set to the first piece of content and the second piece of content. Therefore, it is possible to avoid the scroll message returning to the start of playback again in association with content switching. As a result, the hassle associated with scroll message switching can be avoided regardless of the content switching. In other words, the continuity of the scroll message can be maintained regardless of the content switching.

Figure 6:
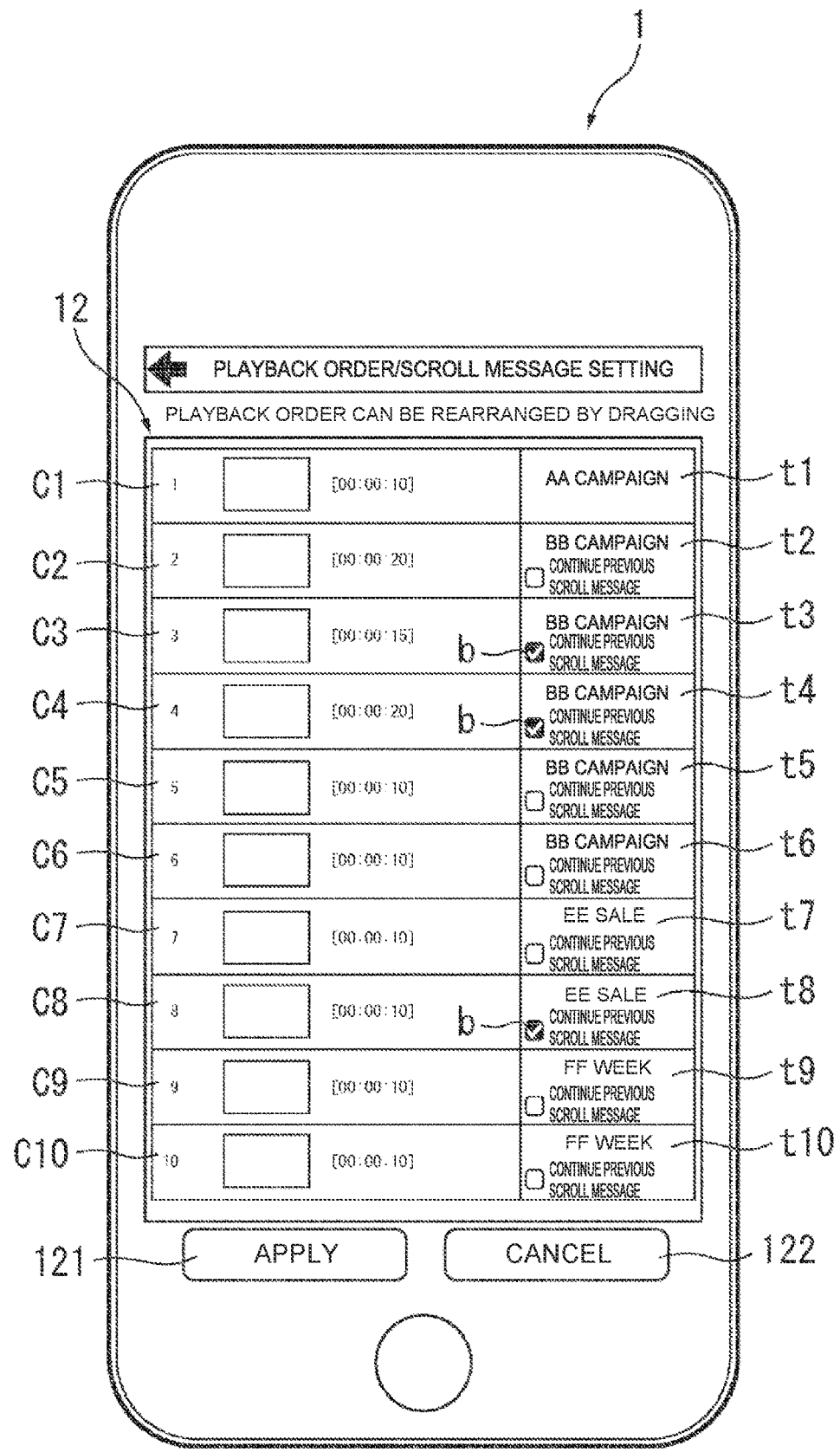
FIG. 6 is a front view of the communication terminal according to the first embodiment.
Figure 7:
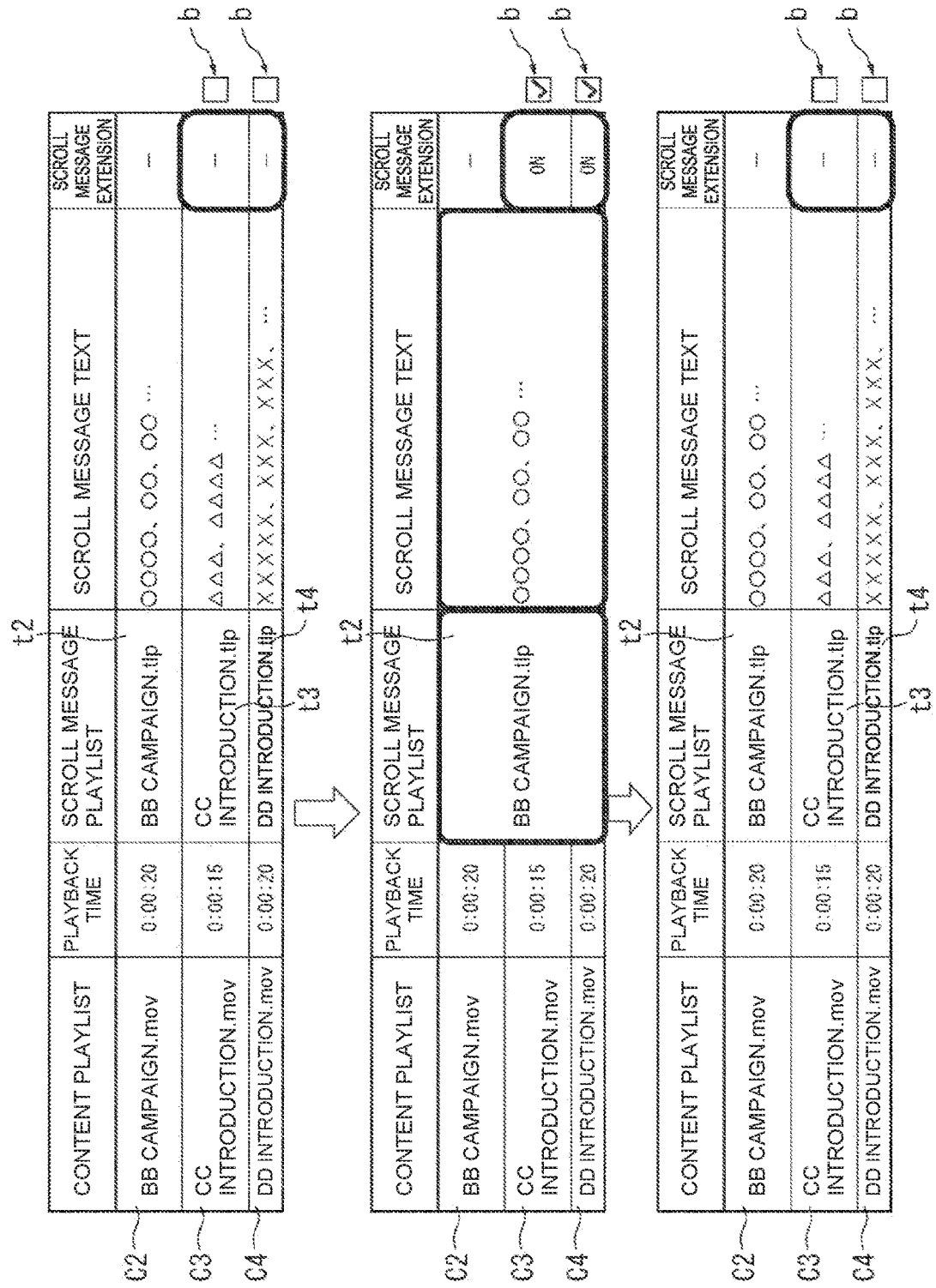
FIG. 7 is an explanatory diagram of a setting procedure of a common scroll message according to the first embodiment.
Figure 8:
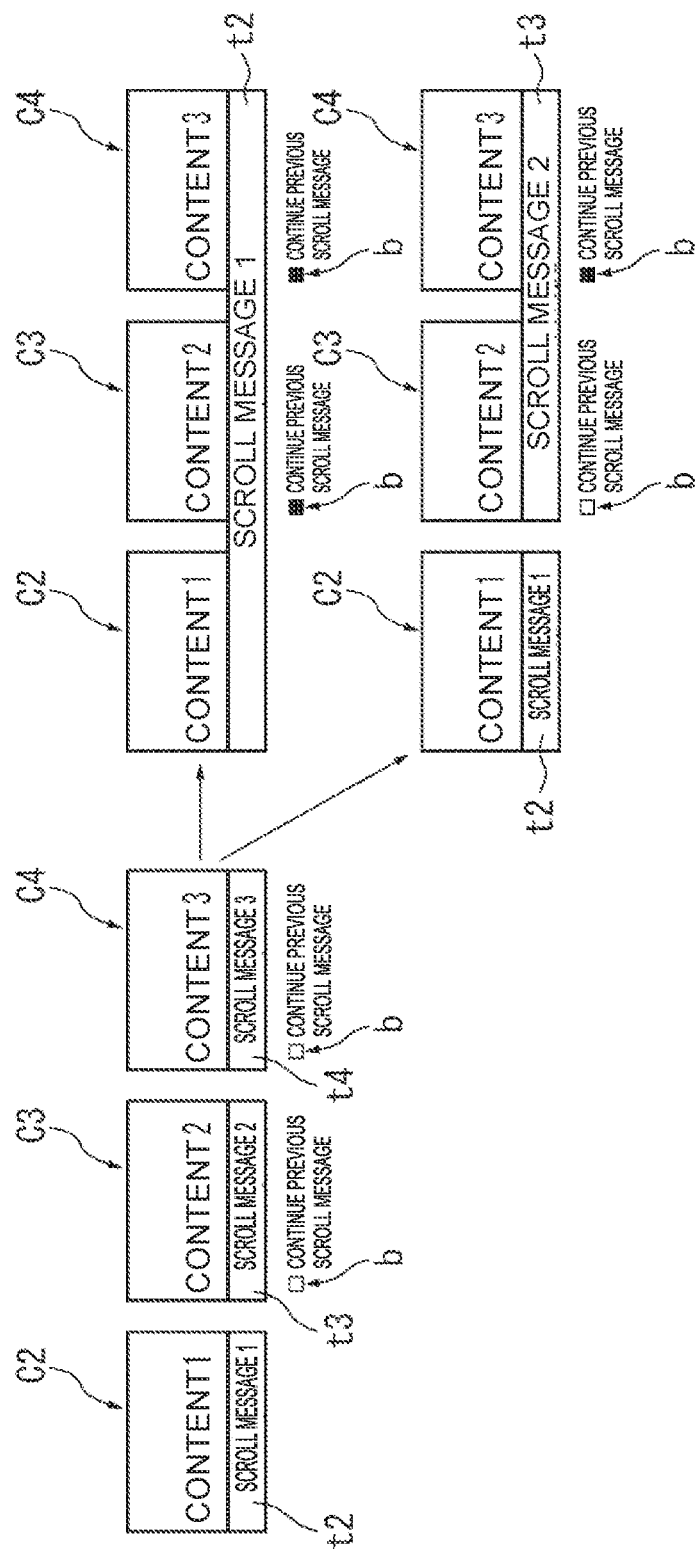
FIG. 8 is an explanatory diagram of the common scroll message according to the first embodiment.

Next, with reference to FIG. 6 to FIG. 8, the common scroll message will be described. FIG. 6 is a front view of the communication terminal 1. FIG. 7 is an explanatory diagram of a setting procedure of the common scroll message. FIG. 8 is an explanatory diagram of the common scroll message.

As illustrated in FIG. 6, the display 12 includes a first content frame C1 to a tenth content frame C10. The first content frame C1 displays a piece of content to be played back first, and the tenth content frame C10 displays a piece of content to be played back tenthly. The respective content frames are placed in order from top to bottom. When pieces of content need not be particularly distinguished, the term "single frame" is hereinafter used as a generic term of a single content frame. Moreover, for explanatory convenience, a single frame adjacent to and immediately before (above) a predetermined content frame is sometimes referred to as a front frame. Furthermore, a single frame adjacent to and immediately after (below) a predetermined content frame is sometimes referred to as a back frame.

In a single frame, a content number, a content thumbnail screen, a playback time, and a title of a scroll message are listed in order from left to right. A first scroll message t1 to a tenth scroll message t10 are set. The first scroll message t1 to the tenth scroll message t10 correspond to the first content frame C1 to the tenth content frame C10. The first scroll message t1 to the tenth scroll message t10 are titles of scroll message texts that are played back simultaneously with the playback of the piece of content in each frame. In the title of the scroll message, an allocated scroll message is displayed as a standard initial scroll message. After the piece of content in the first content frame C1 is played back, the piece of content in the second content frame C2 whose playback time is adjacent to that of the piece of content in the first content frame C1 is played back. For explanatory convenience, hereinafter, the title of the scroll message and the scroll message text are sometimes referred to collectively and simply as the scroll message.

A checkbox b is placed on the lower side of the title of the scroll message. The checkbox b can be checked by the operator manually. The checkbox b has a comment "continue previous scroll message".

When an AA campaign is initially set to the first scroll message t1, the AA campaign scroll message is played back synchronously with playback of a first piece of content. The AA campaign is allocated to the first piece of content as the first scroll message t1. In other words, the AA campaign is an allocated scroll message associated with the first piece of content. Similarly, in the present embodiment, a BB campaign is an allocated scroll message associated with a second piece of content, and an EE sale is an allocated scroll message associated with a seventh piece of content.

In addition to an allocated scroll message associated with a piece of content, the controller 21 sets a common scroll message. When content frames are adjacent to each other, one behind the other, on the basis of the determination result of the adjacency determiner 211, the controller 21 changes a scroll message of the adjacent back frame to a common scroll message. The common scroll message is an allocated scroll message preallocated to the front frame. In other words, the scroll message of the back frame is changed to the allocated scroll message of the front frame. Furthermore, when the common scroll message is set, even if playback of a piece of content in the back frame starts after playback of a piece of content in the front frame has finished, the common scroll message continues to be played back without interruption from the piece of content in the front frame to the piece of content in the back frame. In other words, even if the playback of the piece of content in the back frame starts after the playback of the piece of content in the front frame has finished, the common scroll message is not played back from the beginning.

As illustrated in FIG. 7, for example, a BB campaign is initially set in the second scroll message t2 of the second content frame C2 as the allocated scroll message. Similarly, a CC introduction is set in the third scroll message t3 of the third content frame C3 as the allocated scroll message, and a DD introduction is set in the fourth scroll message t4 of the fourth content frame C4 as the allocated scroll message.

In the third content frame C3 and the fourth content frame C4, a checkbox b is placed for each piece of content. The checkbox b is checked when the scroll message in the front frame is continued regardless of the end of the piece of content. When the checkbox b in the third content frame C3 and the checkbox b in the fourth content frame C4 are checked, the scroll message in the third content frame C3 is changed to the BB campaign in the second content frame C2 that is the front frame. Furthermore, the scroll message in the fourth content frame C4 is changed to the BB campaign in the third content frame C3 that is the front frame. As a result, the BB campaign same as the second content frame C2 is set as the common scroll message in the third content frame C3 and the fourth content frame C4.

When the checkbox b is unchecked, the common scroll message is returned to the allocated scroll message initially preallocated to the content frame. As illustrated in FIG. 8, when the checkbox b in the third content frame C3 and the checkbox b in the fourth content frame C4 are checked, the BB campaign is set as the common scroll message from the second content frame C2 to the fourth content frame C4. In contrast, when the checkbox b in the third content frame C3 is unchecked, the scroll message in the third content frame C3 is returned to the CC introduction as the allocated scroll message, and the scroll message in the fourth content frame C4 is changed to the CC introduction in the third content frame C3 that is the front frame. In other words, the CC introduction is set as the common scroll message of the third content frame C3 and the fourth content frame C4.

Furthermore, in a state before the operation acceptor 212 accepts the operation to set the common scroll message, the first scroll message is set to the first piece of content, and the second scroll message is set to the second piece of content. The operation acceptor 212 accepts an operation to set one of the first scroll message and the second scroll message as the common scroll message to the first piece of content and the second piece of content. Therefore, the scroll message of the piece of content in the front frame can be played back continuously from the piece of content in the front frame to the piece of content in the back frame, or the scroll message of the piece of content in the back frame can be played back continuously from the piece of content in the front frame to the piece of content in the back frame. As a result, in the adjacent pieces of content, either the scroll message of the piece of content in the front frame or the scroll message of the piece of content in the back frame can be used as the common scroll message without requiring a complicated operation.

The display 12 displays, side by side, a plurality of pieces of content in chronological order according to the playback order. Furthermore, the operation acceptor 212 accepts an operation to set a common scroll message respectively for multiple pieces of content whose playback times are determined to be adjacent, among the plurality of pieces of content displayed on the display 12. Then, the common scroll message is set to the multiple pieces of content that have accepted the operation to set the common scroll message. Therefore, the operation acceptor 212 can set the common scroll message simultaneously for the multiple pieces of content. As a result, the setting operation of the common scroll message can be facilitated.

Figure 9:
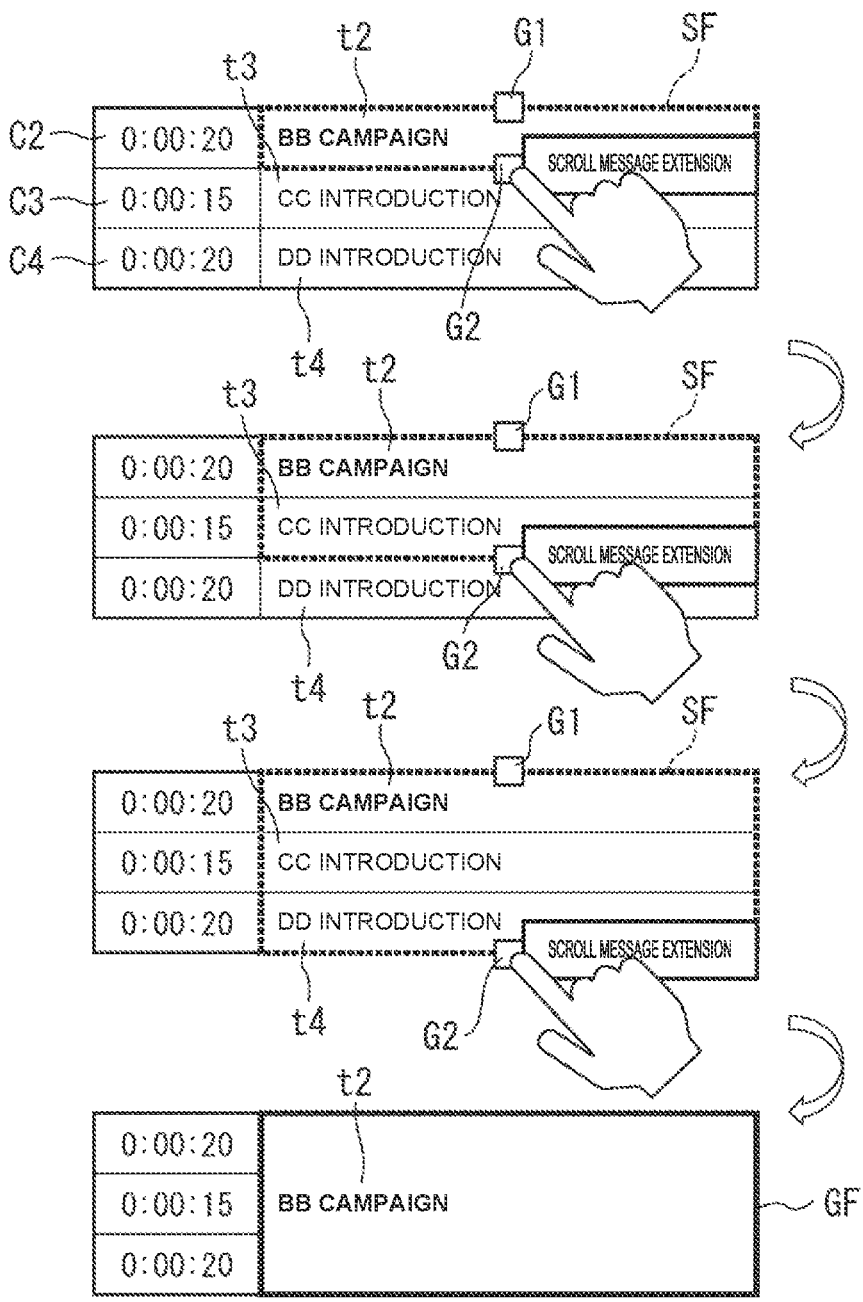
FIG. 9 is an explanatory diagram when a scroll message in a single frame is extended backward according to the first embodiment.
Figure 10:
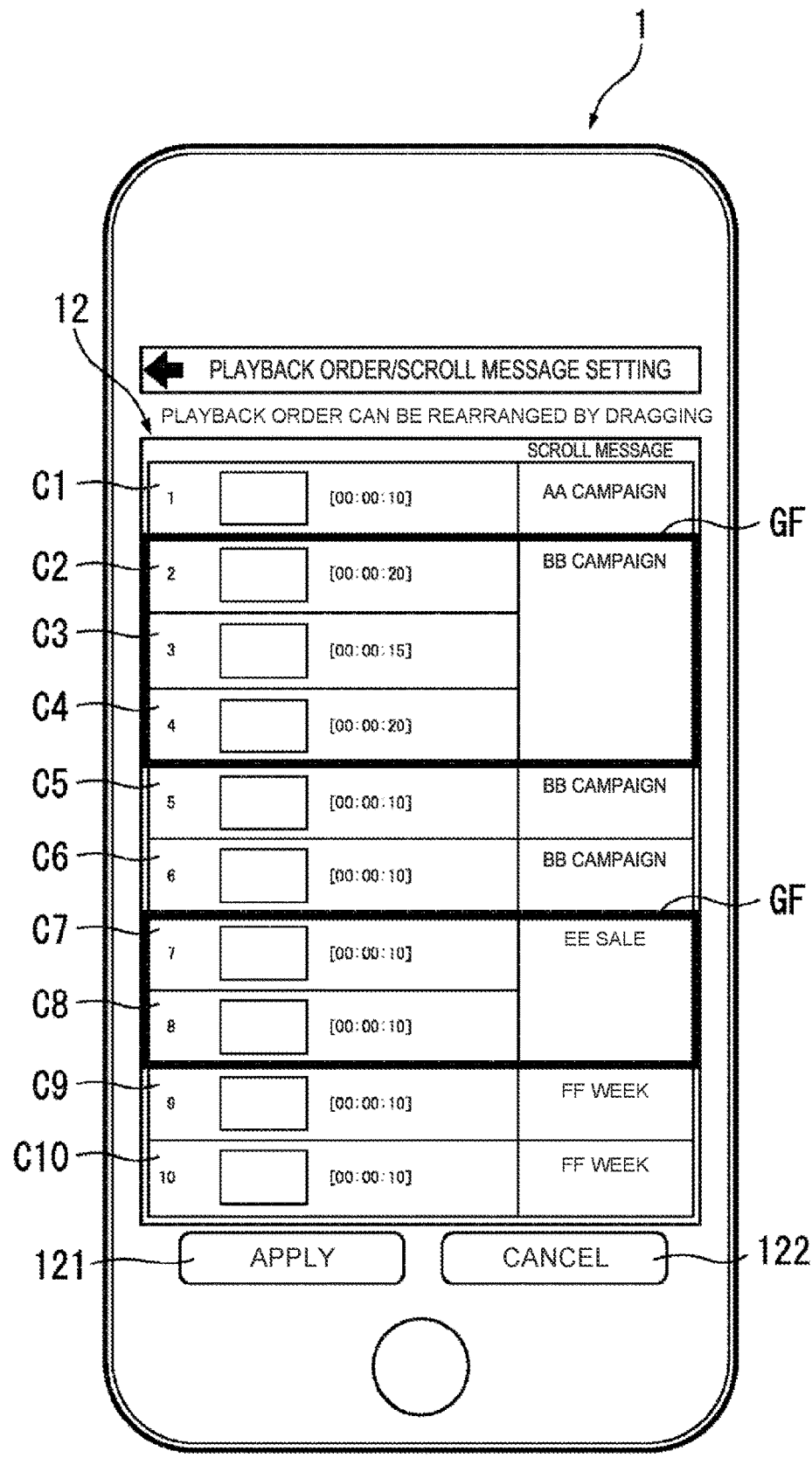
FIG. 10 is a front view of the communication terminal on which a grouping frame is displayed according to the first embodiment.
Figure 11:
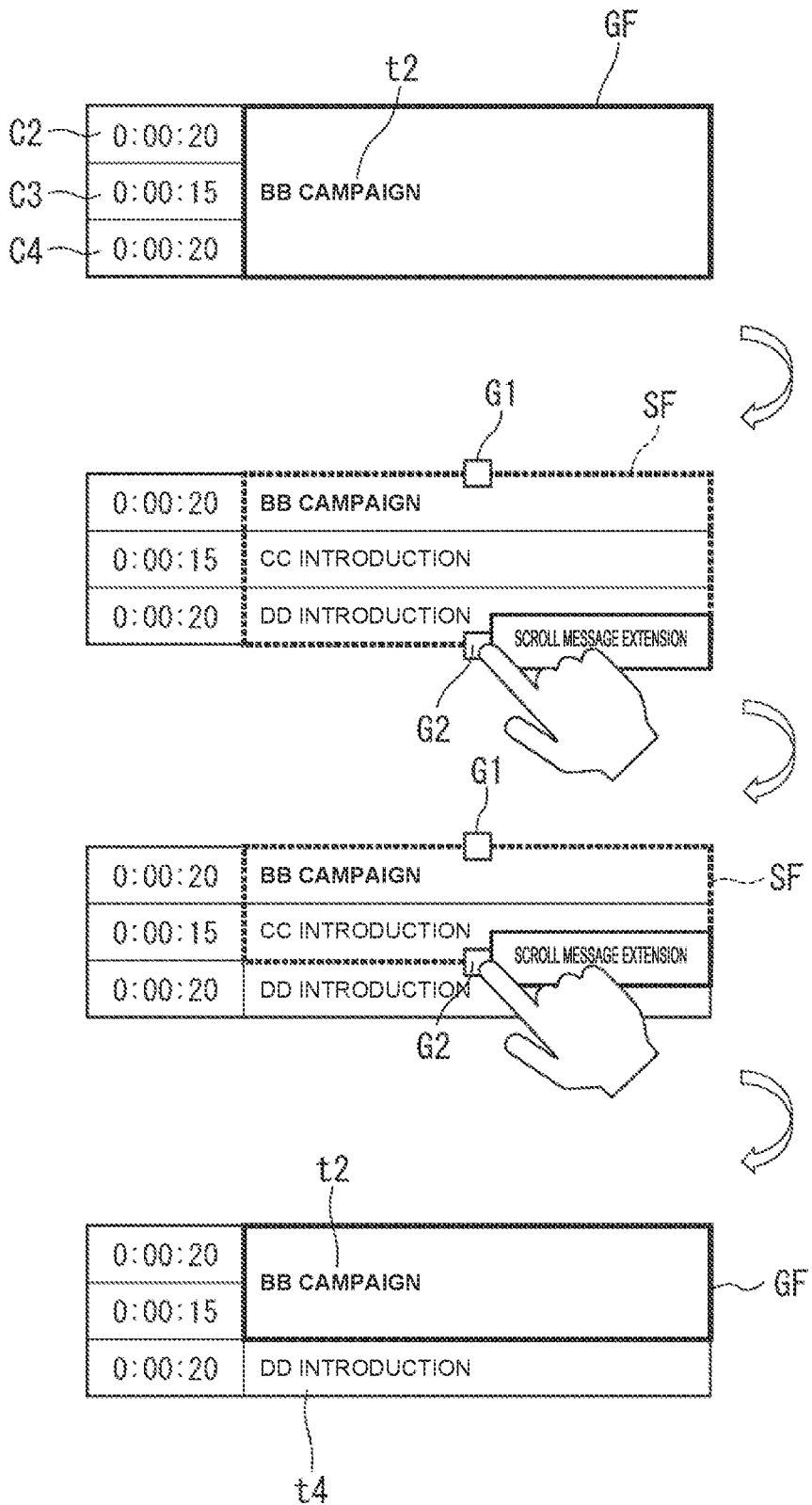
FIG. 11 is an explanatory diagram when the grouping frame is reduced forward according to the first embodiment.
Figure 12:
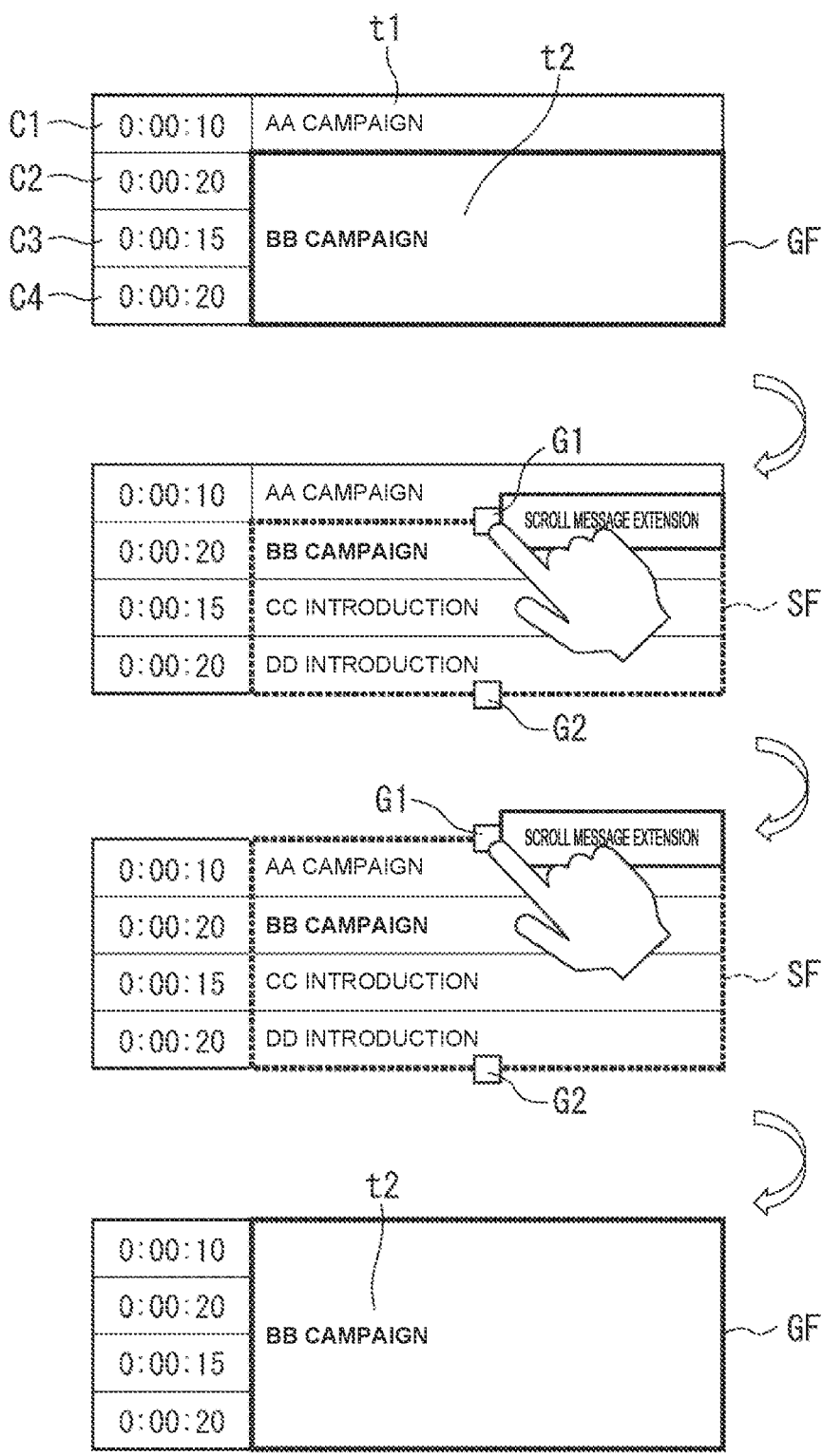
FIG. 12 is an explanatory diagram when the grouping frame is extended forward according to the first embodiment.
Figure 13:
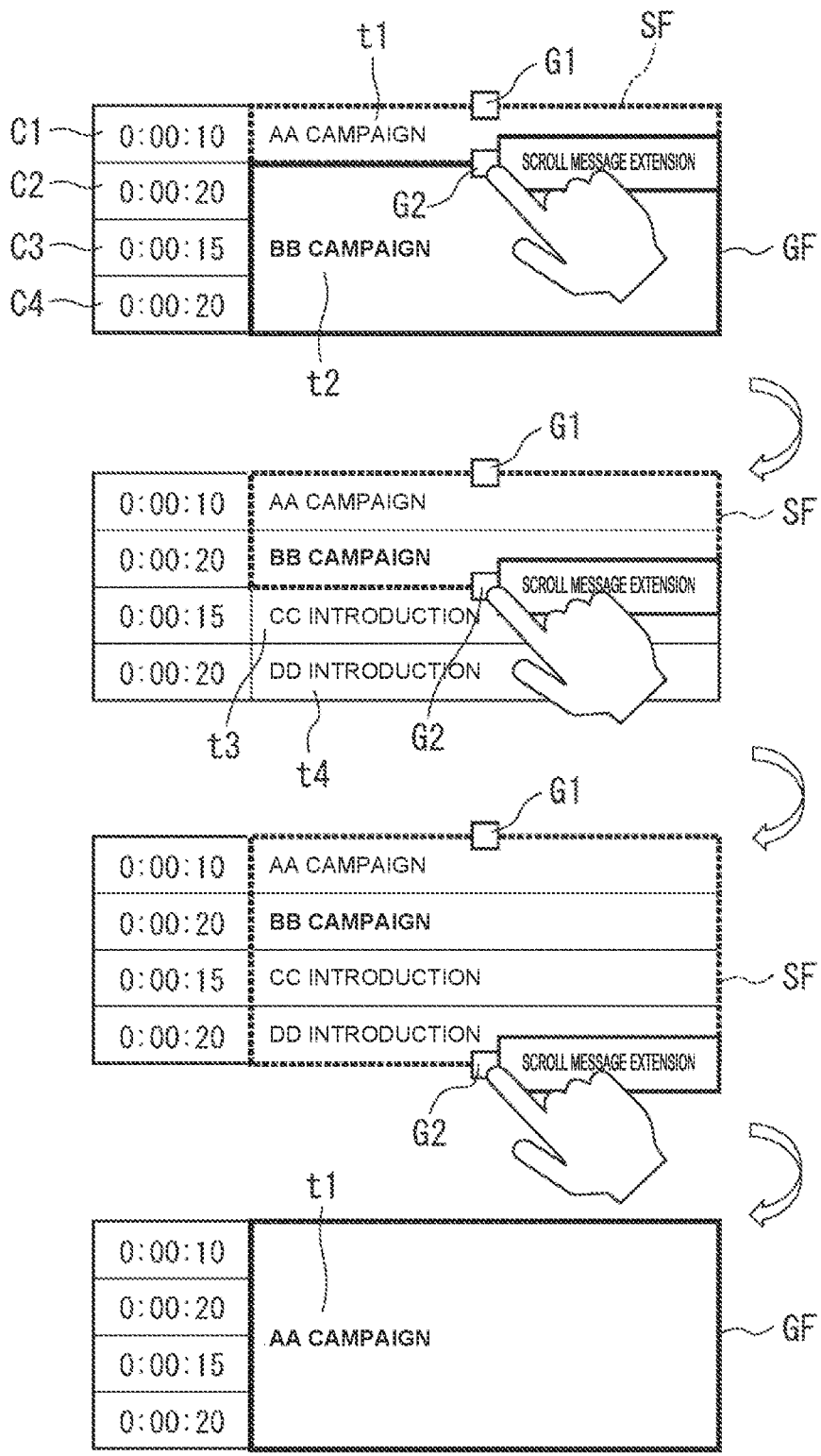
FIG. 13 is an explanatory diagram when a scroll message in a single frame is extended backward according to the first embodiment.

Next, with reference to FIG. 9 to FIG. 13, an extend operation and a reduction operation of the common scroll message will be described. FIG. 9 is an explanatory diagram when a scroll message in a single frame is extended backward. FIG. 10 is a front view of the terminal on which a grouping frame GF is displayed. FIG. 11 is an explanatory diagram when the grouping frame GF is reduced forward. FIG. 12 is an explanatory diagram when the grouping frame GF is extended forward. FIG. 13 is an explanatory diagram when a scroll message in a single frame is extended backward.

First, an operation to extend a scroll message in a single frame backward will be described. As illustrated in FIG. 9, for example, when the second content frame C2 that is a single frame is tapped with a finger or clicked with a mouse, a selection frame SF indicated by the dashed line is displayed corresponding to the scroll message in the second content frame C2 (second scroll message t2). The selection frame SF has a grip G1 at the center of a front (upper) line region and a grip G2 at the center of a back (lower) line region.

When the operator drags the grip G2 with a finger or a mouse, an auxiliary comment indicating "scroll message extension" is displayed in the vicinity of the grip G2. Moreover, while the grip G2 is dragged, in order to let the operator anticipate the substance after the scroll message extension, allocated scroll messages to be temporarily disabled by the current operation are grayed out, for example.

For example, when the grip G2 is moved backward to the fourth content frame C4, the selection frame SF is extended to the fourth content frame C4. The allocated scroll messages in the third content frame C3 and the fourth content frame C4 are grayed out. Furthermore, the title of the allocated scroll message in the second content frame C2 (BB campaign) to be extended as the common scroll message is highlighted by boldface, for example.

When the operator releases his/her finger or the mouse from the grip G2, the grayed-out allocated scroll messages disappear, and the extension of the region of the common scroll message is fixed, as illustrated in FIG. 10. Moreover, a grouping frame GF defining multiple content frames in which the common scroll message is set is indicated by the solid line. The grouping frame GF is set to enclose, for example, the second scroll message t2 to the fourth scroll message t4. After the setting of the extension is fixed (the grouping frame GF is displayed), the operator sends the setting of the extension of the common scroll message (display command) to the server 2 by executing an ON operation of the apply button 121.

Next, an operation to reduce the grouping frame GF forward will be described. The grouping frame GF is set to enclose, for example, the second scroll message t2 to the fourth scroll message t4. As illustrated in FIG. 11, when the grouping frame GF is tapped with a finger or clicked with a mouse, a selection frame SF indicated by the dashed line is displayed corresponding to the grouping frame GF. The selection frame SF has a grip G1 at the center of a front line region and a grip G2 at the center of a back line region.

For example, when the operator drags the grip G2 with a finger or a mouse, an auxiliary comment indicating "scroll message extension" is displayed in the vicinity of the grip G2. Moreover, while the grip G2 is dragged, in order to let the operator anticipate the substance after the scroll message reduction, allocated scroll messages in the grouping frame GF are grayed out.

When the grip G2 is moved forward to the third content frame C3, the selection frame SF is reduced. The common scroll message is set in the second content frame C2 and the third content frame C3. The fourth scroll message t4 of the fourth content frame C4 is changed from the BB campaign that is the common scroll message to the DD introduction that is the allocated scroll message. After the reduction is fixed, the operator sends the setting of the reduction of the common scroll message (display command) to the server 2 by executing the apply button 121.

Next, an operation to extend the grouping frame GF forward will be described. The grouping frame GF is set to enclose the second scroll message t2 to the fourth scroll message t4. The common scroll message of the grouping frame GF is the BB campaign. As illustrated in FIG. 12, when the grouping frame GF is tapped with a finger or clicked with a mouse, a selection frame SF indicated by the dashed line is displayed corresponding to the grouping frame GF. The selection frame SF has a grip G1 at the center of a front line region and a grip G2 at the center of a back line region.

For example, when the operator drags the grip G1 with a finger or a mouse, an auxiliary comment indicating "scroll message extension" is displayed in the vicinity of the grip G1. Moreover, while the grip G1 is dragged, in order to let the operator anticipate the substance after the scroll message extension, allocated scroll messages in the grouping frame GF are grayed out.

When the grip G1 is moved forward to the first content frame C1, the selection frame SF is extended. The common scroll message is set in the first content frame C1 to the fourth content frame C4. The common scroll message is the BB campaign. The first scroll message t1 of the first content frame C1 is changed from the AA campaign that is the allocated scroll message to the BB campaign that is the common scroll message. After the setting of the extension is fixed, the operator sends the setting of the extension of the common scroll message (display command) to the server 2 by executing an ON operation of the apply button 121.

Next, an operation to unset the grouping frame GF and to extend a single frame backward will be described. The grouping frame GF is set to enclose the second scroll message t2 to the fourth scroll message t4. The common scroll message of the grouping frame GF is the BB campaign. As illustrated in FIG. 13, when the first content frame C1 that is a single frame is tapped with a finger or clicked with a mouse, a selection frame SF indicated by the dashed line is displayed corresponding to the first content frame C1. The selection frame SF has a grip G1 at the center of a front line region and a grip G2 at the center of a back line region.

For example, when the operator drags the grip G2 with a finger or a mouse, an auxiliary comment indicating "scroll message extension" is displayed in the vicinity of the grip G2. The grouping frame GF adjacent to the selection frame SF is unset. Moreover, while the grip G2 is dragged, in order to let the operator anticipate the substance after the scroll message extension, allocated scroll messages in the grouping frame GF are grayed out.

When the grip G2 is moved backward to the fourth content frame C4, the selection frame SF is extended. The common scroll message is set in the first content frame C1 to the fourth content frame C4. The common scroll message is the AA campaign. The second scroll message t2 of the second content frame C2 to the fourth scroll message t4 of the fourth content frame C4 are changed from each of the allocated scroll messages to the AA campaign that is the common scroll message. After the extension is fixed, the operator sends the setting of the extension of the common scroll message (display command) to the server 2 by executing the apply button 121.

In other words, the display 12 displays, side by side, a plurality of pieces of content in chronological order according to the playback order. The operation acceptor 212 accepts an operation to specify a grouping range and group multiple pieces of content whose playback times are determined to be adjacent, among the plurality of pieces of content displayed on the display 12. Then, the operation acceptor 212 sets the common scroll message to the grouped multiple pieces of content. Therefore, the common scroll message can be set using the grouping frame GF. As a result, a region in which the common scroll message is to be set can be specified using the grouping frame GF while being visually confirmed. Thus, an incorrect setting of the common scroll message can be suppressed.

Figure 14:
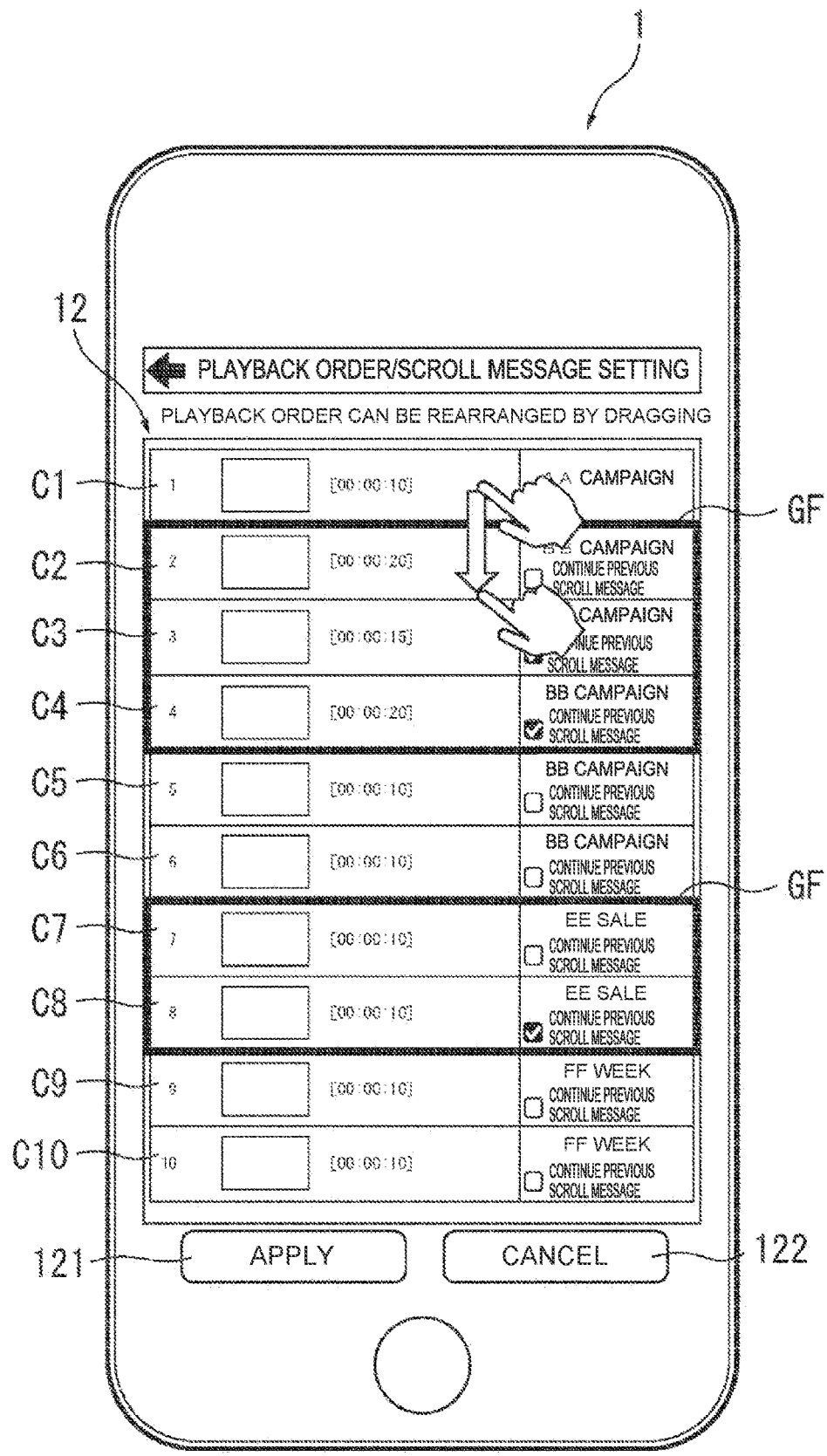
FIG. 14 is a diagram illustrating an operation procedure when a single frame is inserted into the grouping frame according to the first embodiment.
Figure 15:
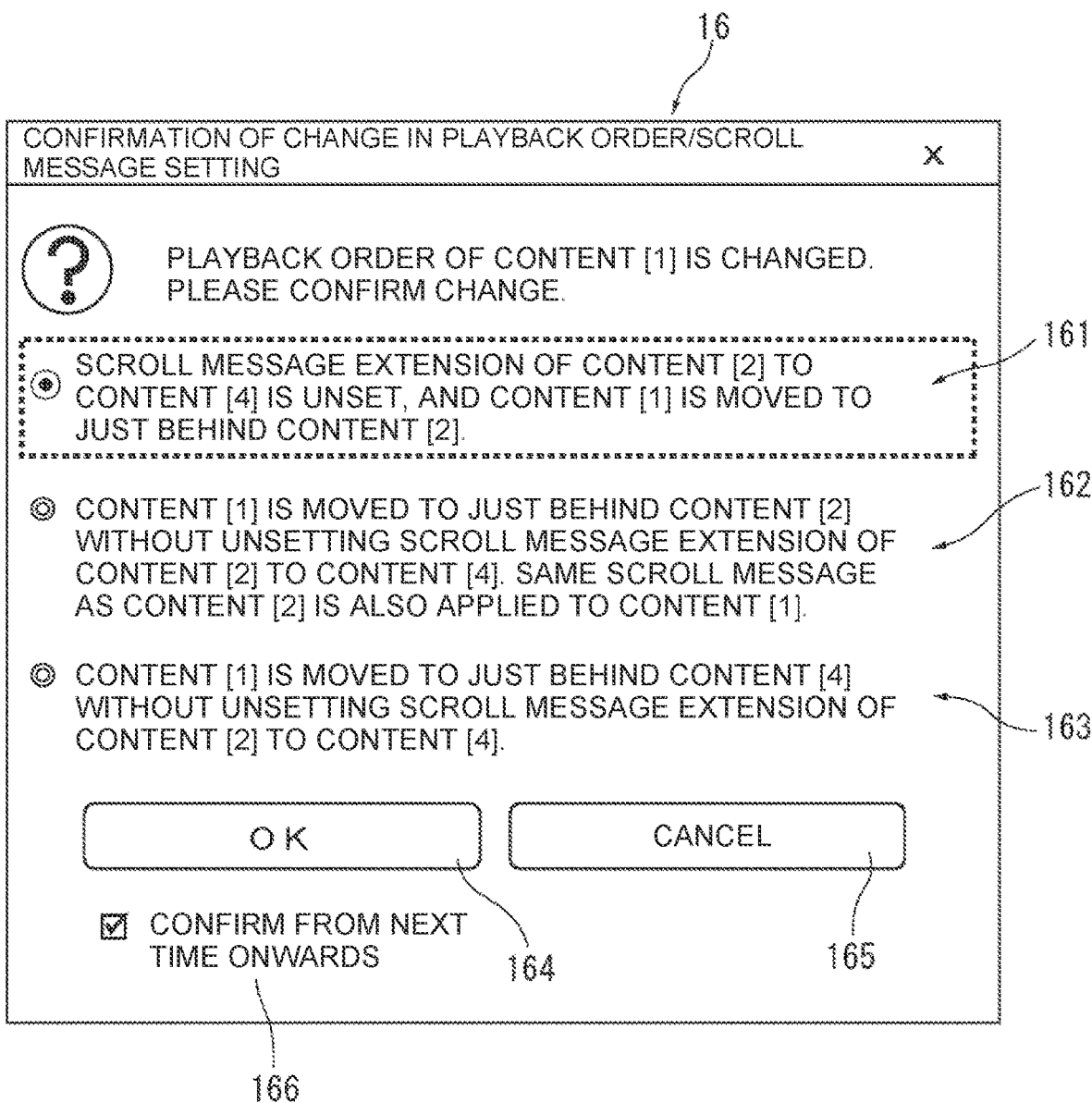
FIG. 15 is a diagram illustrating an example of a dialog box according to the first embodiment.
Figure 16:
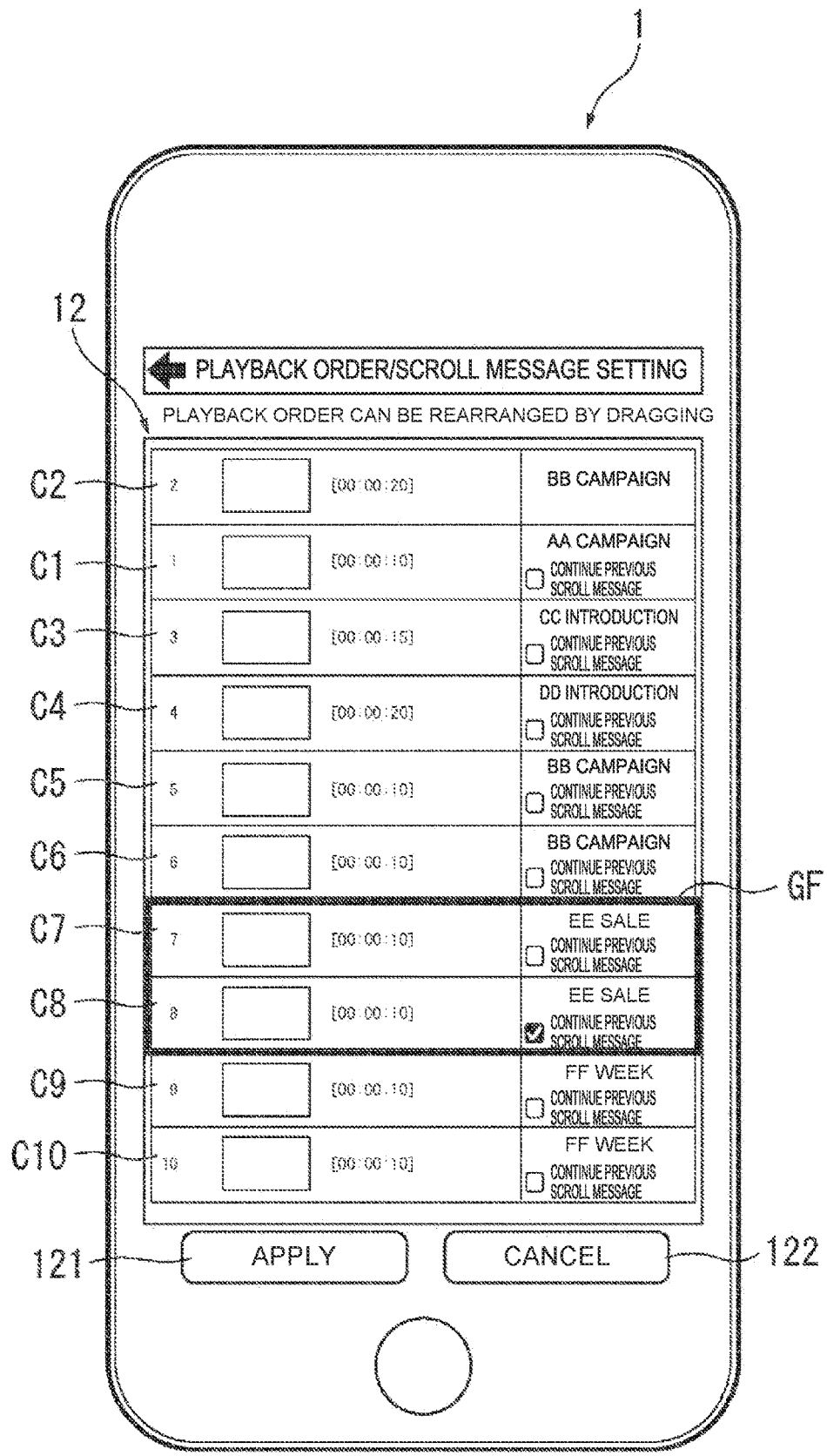
FIG. 16 is a front view of the communication terminal on which the grouping frame is unset according to the first embodiment.
Figure 17:
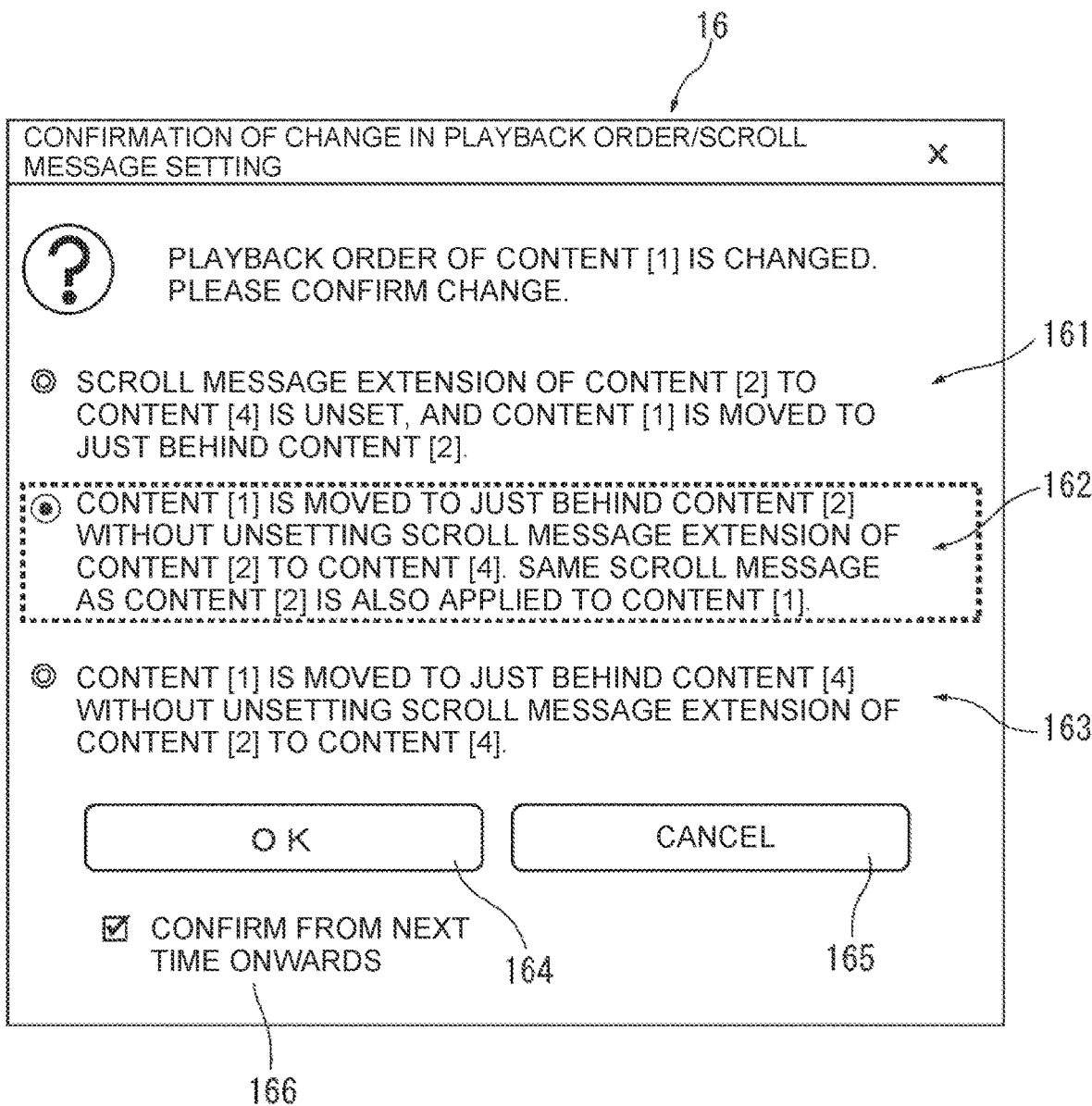
FIG. 17 is a diagram illustrating another example of the dialog box according to the first embodiment.
Figure 18:
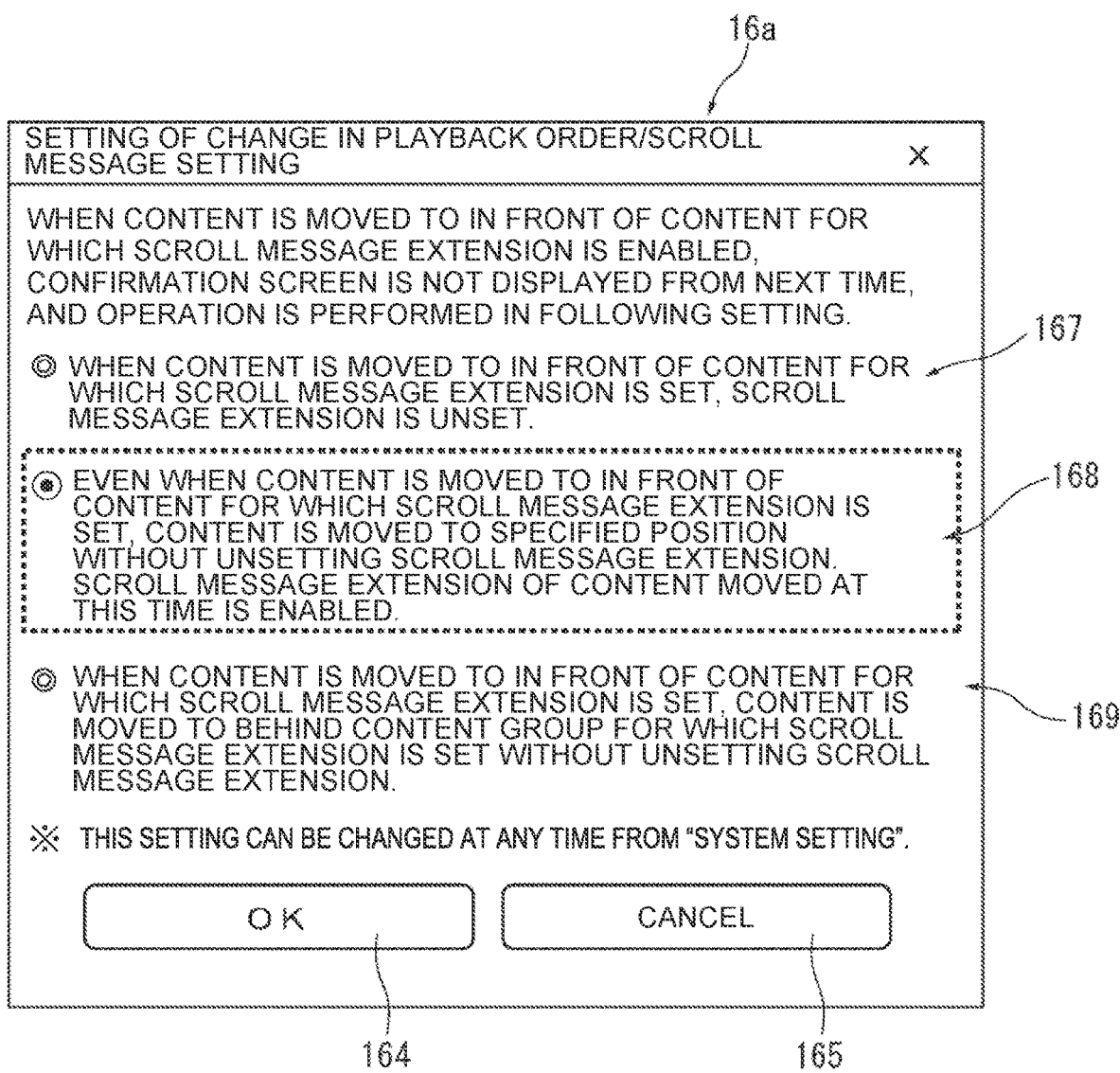
FIG. 18 is a diagram illustrating another example of the dialog box according to the first embodiment.

Next, with reference to FIG. 14 to FIG. 18, an insert operation to insert a single frame into the grouping frame GF will be described. FIG. 14 is a diagram illustrating an operation procedure when a single frame is inserted into the grouping frame GF. FIG. 15 is a diagram illustrating an example of a dialog box. FIG. 16 is a front view of the communication terminal 1 on which the grouping frame GF is unset. FIG. 17 is a diagram illustrating another example of the dialog box. FIG. 18 is a diagram illustrating another example of the dialog box.

As illustrated in FIG. 14, for example, two grouping frames GF are displayed on the display 12 of the communication terminal 1. The front grouping frame GF includes the second content frame C2 to the fourth content frame C4. The common scroll message is the BB campaign. The back grouping frame GF includes the seventh content frame C7 and the eighth content frame C8. The common scroll message is the EE sale. In the front grouping frame GF, for example, when the first content frame C1 is inserted between the second content frame C2 and the third content frame C3, the operator drags the first content frame C1 with a finger or a mouse and drops the first content frame C1 between the second content frame C2 and the third content frame C3.

For example, when the first content frame C1 is dropped between the second content frame C2 and the third content frame C3, a dialog box 16 showing a screen to confirm changes is displayed on the display 12, as illustrated in FIG. 15. The dialog box 16 includes a first option 161, a second option 162, a third option 163, an OK button 164, a cancel button 165, and a checkbox 166. The checkbox 166 can specify whether to confirm from next time onwards.

The operator can select any option among the first option 161 to the third option 163. In the case where the first option 161 is selected, the scroll message extension (grouping) of the second content frame C2 to the fourth content frame C4 is unset. Then, the first content frame C1 is moved to just behind the second content frame C2. When the OK button 164 is clicked after the first option 161 is selected, the front grouping frame GF is unset, and the scroll messages in the third content frame C3 and the fourth content frame C4 are changed from the common scroll message to the respective allocated scroll messages, as illustrated in FIG. 16.

In other words, the operation acceptor 212 includes a content playback time change operation acceptor 212a. The content playback time change operation acceptor 212a is hereinafter referred to as a first operation acceptor 212a. The first operation acceptor 212a accepts an operation to change the playback times of the plurality of pieces of content. In a state where the common scroll message is set to the first piece of content and the second piece of content, when a state where the playback times of the first piece of content and the second piece of content are not adjacent is determined as a result of a change in the playback time of the first piece of content or the second piece of content, the controller 21 unsets the common scroll message set to the first piece of content and the second piece of content. The adjacency determiner 211 determines the state where the playback times of the first piece of content and the second piece of content are not adjacent. Therefore, even for multiple pieces of content for which the common scroll message is set, the common scroll message can be easily unset according to the change in the playback time. As a result, a state where the scroll message is played back continuously even though pieces of content are not successive can be easily avoided.

Furthermore, the operation acceptor 212 includes a content playback order change operation acceptor 212b. The content playback order change operation acceptor 212b is hereinafter referred to as a second operation acceptor 212b. The second operation acceptor 212b accepts an operation to change the playback order of the plurality of pieces of content. In a state where the common scroll message is set to the first piece of content and the second piece of content, when an operation to insert the third piece of content in which the third scroll message is set between the first piece of content and the second piece of content is accepted, the controller 21 inserts the third piece of content into the playback order between the first piece of content and the second piece of content. Then, the controller 21 unsets the common scroll message (grouping frame GF) set to the first piece of content and the second piece of content. For example, when the operator allows the insertion of the third scroll message into the grouping frame GF, the grouped pieces of content are unset, and a piece of content with a scroll message different from the common scroll message can be easily inserted into the grouped pieces of content. As a result, the playback order can be set with priority given to the operator's intention to insert.

As illustrated in FIG. 17, in the case where the second option 162 is selected, the first content frame C1 is moved to just behind the second content frame C2 without unsetting the scroll message extension (grouping frame GF) of the second content frame C2 to the fourth content frame C4. The common scroll message (BB campaign) same as the second content frame C2 is applied to the scroll message of the first content frame C1. In other words, in addition to the scroll message extension of the second content frame C2 to the fourth content frame C4, a scroll message extension to move the first content frame C1 to just behind the second content frame C2 is executed.

In the case where the third option 163 is selected, the first content frame C1 is placed just behind the fourth content frame C4 without unsetting the scroll message extension of the second content frame C2 to the fourth content frame C4. In a state where the common scroll message is set to the first piece of content and the second piece of content, when an operation to insert the third piece of content in which the third scroll message is set between the first piece of content and the second piece of content is accepted, the controller 21 inserts the third piece of content behind the second piece of content. The common scroll message set to the first piece of content and the second piece of content is maintained. Therefore, the third scroll message can be played back while maintaining the grouping with the common scroll message. As a result, the playback of the initially set common scroll message and the playback of the third scroll message can be executed. Specifically, the playback of the piece of content in the first content frame C1 is executed after the playback of the piece of content in the fourth content frame C4. The AA campaign scroll message is executed during the playback of the piece of content in the first content frame C1.

When the OK button 164 is clicked without checking the checkbox 166 in the case where the second option 162 is selected, a dialog box 16a is displayed. The dialog box 16a confirms subsequent operations.

As illustrated in FIG. 18, the dialog box 16a includes a fourth option 167, a fifth option 168, a sixth option 169, the OK button 164, and the cancel button 165. In the case where the fourth option 167 is selected, when the third piece of content is moved to the front of the pieces of content for which the scroll message extension (grouping) is set, the scroll message extension is unset. In the case where the fifth option 168 is selected, the third piece of content is moved to the front of the pieces of content for which the scroll message extension is set, and the scroll message extension including the third piece of content is enabled. In the case where the sixth option 169 is selected, the scroll message extension is maintained, and the third piece of content is moved to behind the pieces of content for which the scroll message extension is set. The operator can select any option among the fourth option 167 to the sixth option 169.

Figure 19:
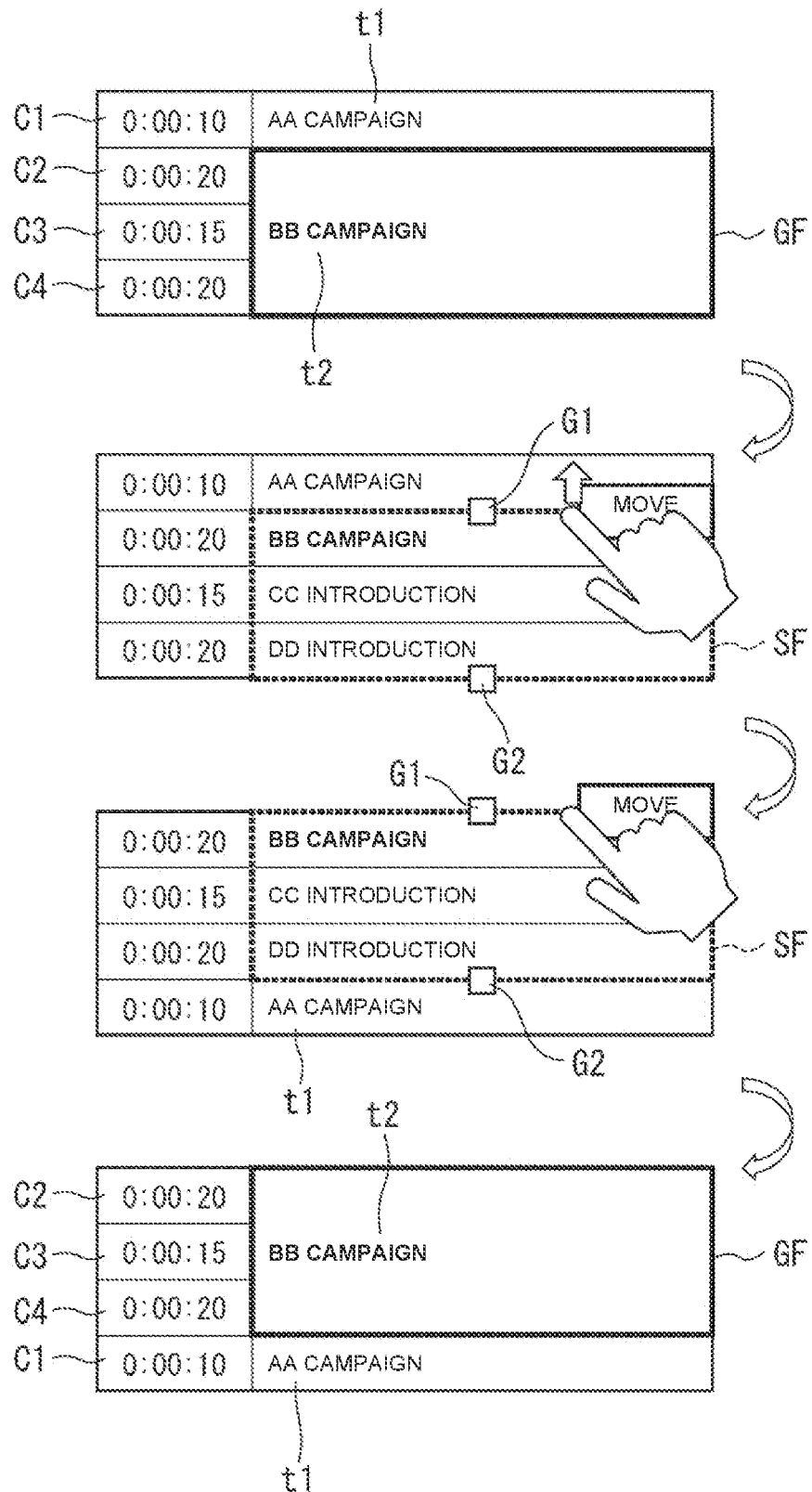
FIG. 19 is an explanatory diagram when multiple content frames corresponding to the grouping frame are moved according to the first embodiment.
Figure 20:
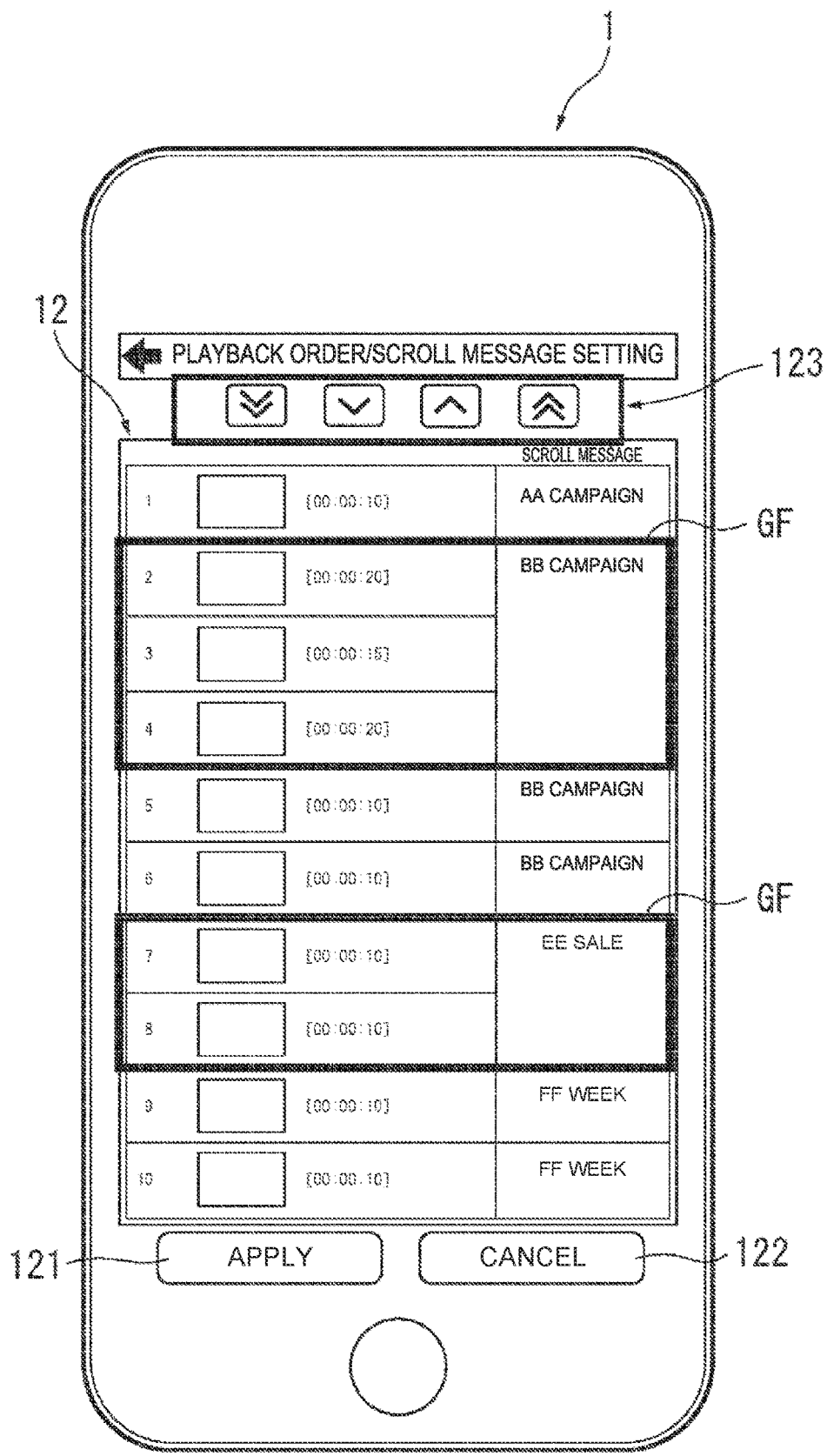
FIG. 20 is a diagram illustrating a display on which a button operation acceptor is displayed according to the first embodiment.
Figure 21:
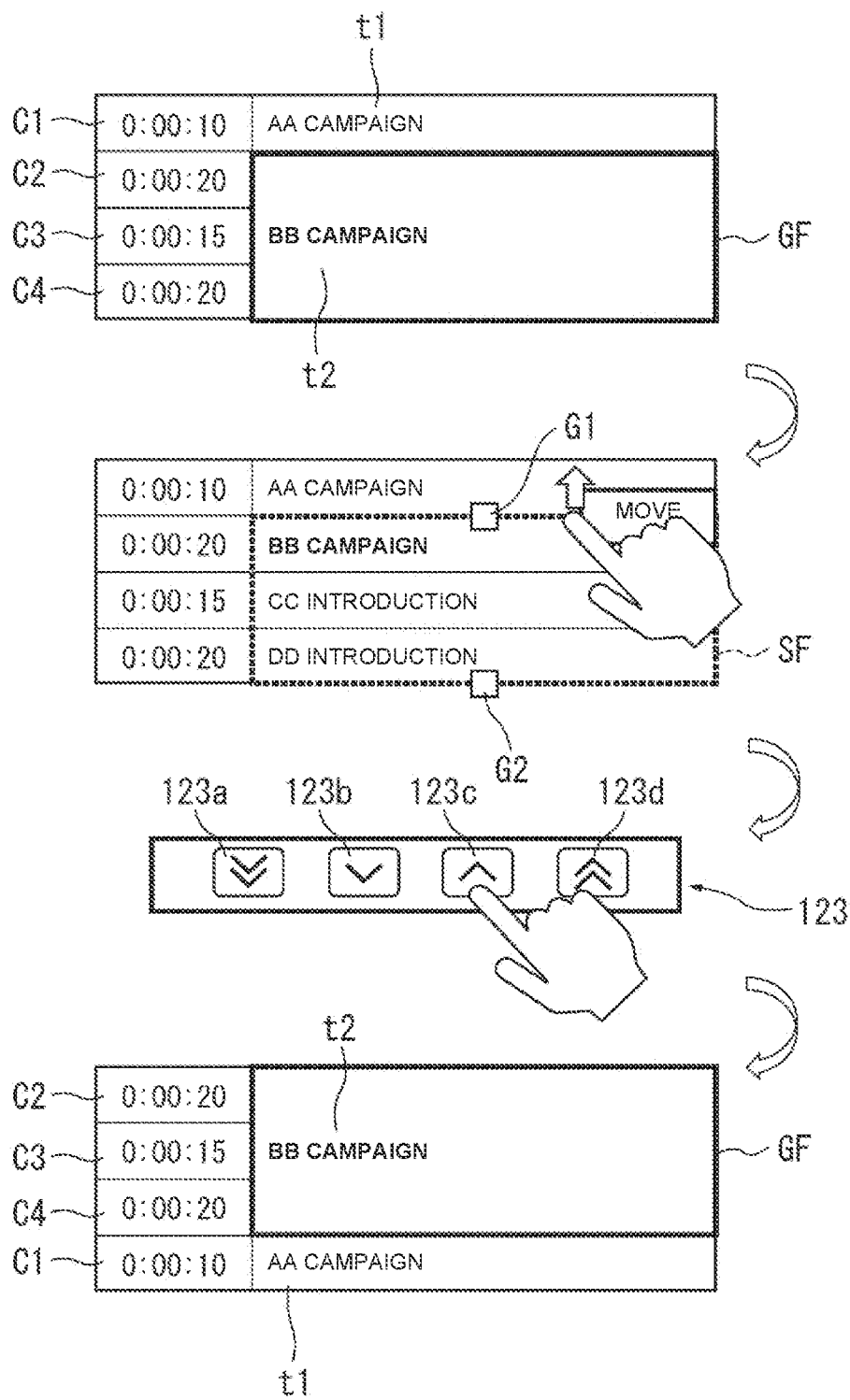
FIG. 21 is an explanatory diagram when the multiple content frames corresponding to the grouping frame are moved according to the first embodiment.

Next, with reference to FIG. 19 to FIG. 21, an operation to move the grouping frame GF in a group will be described. FIG. 19 is an explanatory diagram when the grouping frame is moved. FIG. 20 is a diagram illustrating the display 12 on which a button operation acceptor 123 is displayed. FIG. 21 is an explanatory diagram when the grouping frame GF is moved.

As illustrated in FIG. 19, when the grouping frame GF including the second content frame C2 to the fourth content frame C4 is tapped with a finger or clicked with a mouse, a selection frame SF indicated by the dashed line is displayed. The selection frame SF has a grip G1 at the center of a front line region and a grip G2 at the center of a back line region.

For example, when the operator drags a part of the selection frame SF other than the grips with a finger or a mouse, an auxiliary comment indicating "move" is displayed in the empty space on the left, right, top, and bottom of the selected position. Moreover, while the selection frame SF is dragged, allocated scroll messages in the grouping frame GF are displayed to be grayed out except for the common scroll message.

When the front line region of the selection frame SF is moved forward by one frame, the piece of content in the first content frame C1 is moved to behind the grouping frame GF. In other words, the piece of content in the first content frame C1 is played back after the piece of content in the fourth content frame C4. When the operator releases his/her finger or the mouse from the grouping frame GF, the movement is set. The operator sends the movement setting (display command) to the server 2 by executing the apply button 121.

Moreover, the movement setting using the button operation acceptor 123 is possible. When the operator drags a part of the selection frame SF other than the grips with a finger or a mouse, the button operation acceptor 123 is displayed on the upper side of the display 12, as illustrated in FIG. 20. As illustrated in FIG. 21, when the front line region of the selection frame SF is moved forward by one frame, a button 123*c* of the button operation acceptor 123 is selected. The movement is set by the operation of the button operation acceptor 123. The selection of a button 123*a* indicates the movement to the very back of the display 12, the selection of a button 123*b* indicates the movement backward by one frame, and the selection of a button 123*d* indicates the movement to the very front of the display 12.

In a state where the common scroll message is set to the first piece of content and the second piece of content, when an operation to change a playback order of the first piece of content and the second piece of content is accepted, the controller 21 changes the playback order of the first piece of content and the second piece of content. The common scroll message set to the first piece of content and the second piece of content is maintained. Therefore, the playback order of the first piece of content and the second piece of content can be changed while maintaining the common scroll message. As a result, the playlist can be changed while maintaining the grouping frame GF.

Figure 22:
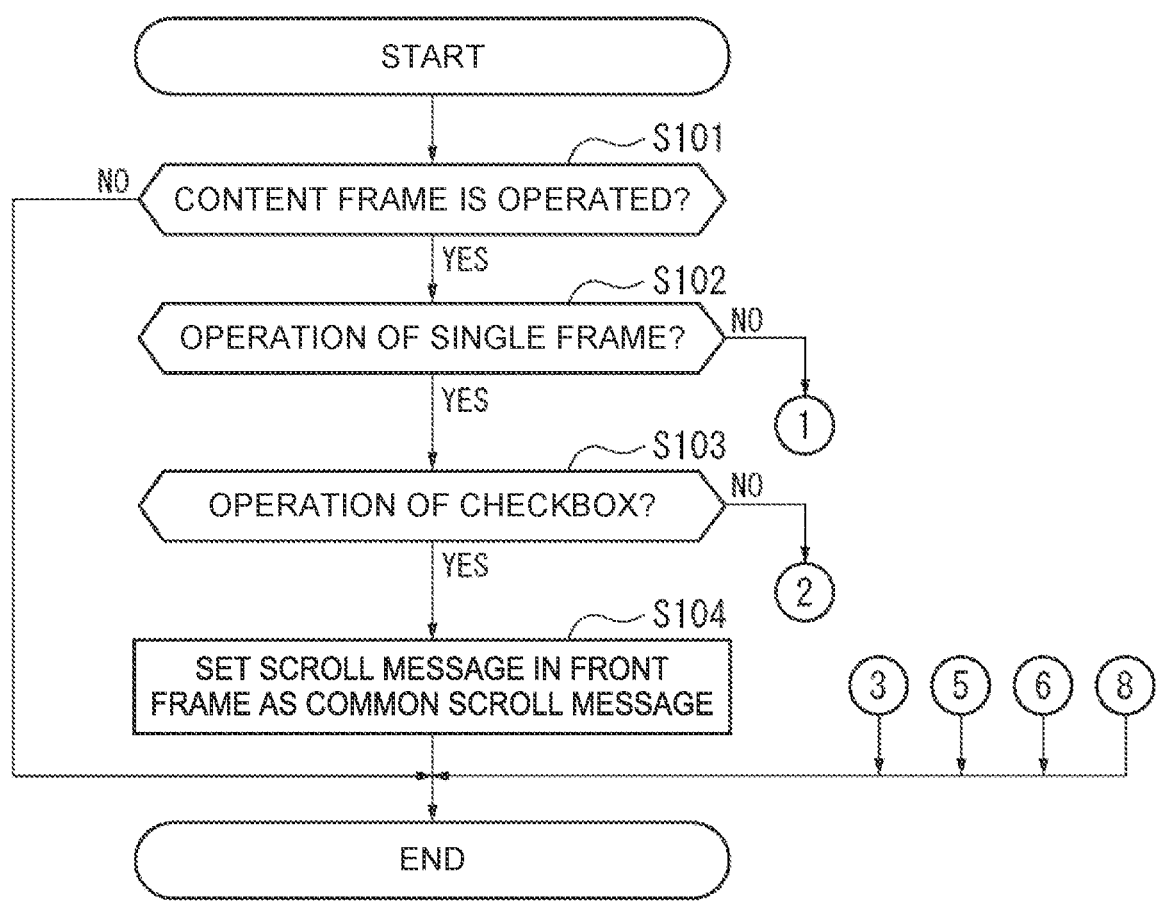
FIG. 22 is a part of a flowchart illustrating operations of a controller according to the first embodiment.

Next, with reference to a flowchart of FIG. 22 to FIG. 26, processing of the controller 21 when a content management is executed will be described. FIG. 22 is a part of a flowchart illustrating operations of the controller 21 according to the embodiment of the present disclosure. FIG. 23 to FIG. 26 are the rest of the flowchart illustrating the operations of the controller 21 according to the embodiment of the present disclosure. As illustrated in FIG. 22 to FIG. 26, the computer program stored in the storage device of the storage 23 causes the processor of the controller 21 to execute processing of step S101 to step S126.

As illustrated in FIG. 22, in step S101, the controller 21 determines whether the content frame is operated. When the controller 21 determines that the content frame is operated (Yes in step S101), the processing proceeds to step S102. When the controller 21 determines that the content frame is not operated (No in step S101), the processing illustrated in FIG. 22 is terminated.

In step S102, the controller 21 determines whether the processing is the operation of the single frame. When the controller 21 determines that the processing is the operation of the single frame (Yes in step S102), the processing proceeds to step S103. When the controller 21 determines that the processing is not the operation of the single frame (No in step S102), the processing proceeds to step S116 because the processing is the operation of the grouping frame GF.

In step S103, the controller 21 determines whether the processing is the operation of the checkbox b. When the controller 21 determines that the processing is the operation of the checkbox b (Yes in step S103), the processing proceeds to step S104. When the controller 21 determines that the processing is not the operation of the checkbox b (No in step S103), the processing proceeds to step S105 because the processing is the operation of the frame in the single frame.

In step S104, the controller 21 sets the scroll message in the front frame as the common scroll message to the content frame to be operated. The scroll message in the content frame to be operated is set as the common scroll message. When the setting of the common scroll message is completed, the processing is terminated.

Figure 23:
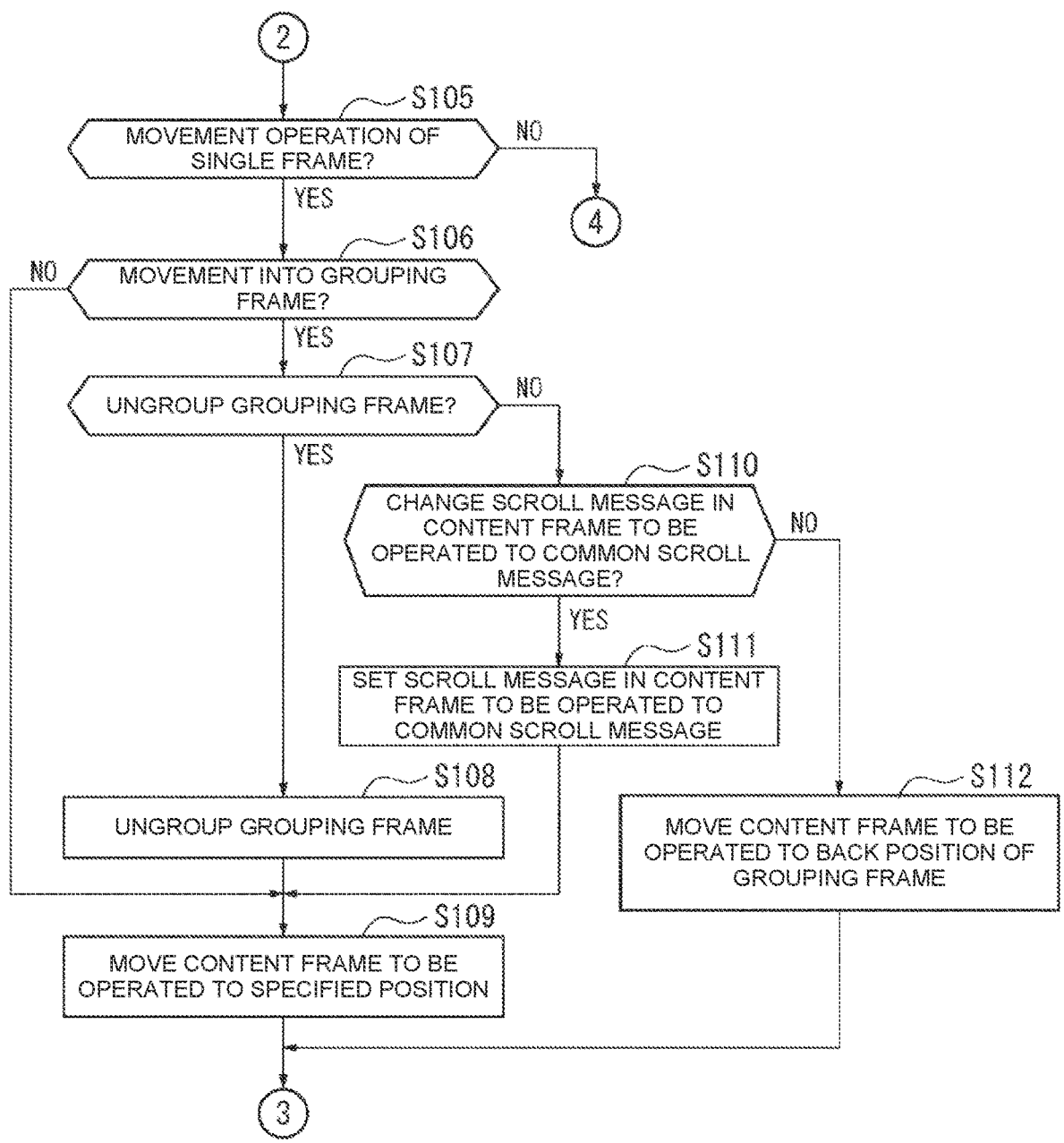
FIG. 23 is the rest of the flowchart illustrating the operations of the controller according to the first embodiment.

As illustrated in FIG. 23, in step S105, the controller 21 determines whether the processing is the movement operation of the single frame. When the controller 21 determines that the processing is the movement operation of the single frame (Yes in step S105), the processing proceeds to step S106. When the controller 21 determines that the processing is not the movement operation of the single frame (No in step S105), the processing proceeds to step S113 because the processing is the extend operation of the frame.

In step S106, the controller 21 determines whether the processing is the movement into the grouping frame GF. When the controller 21 determines that the processing is the movement into the grouping frame GF (Yes in step S106), the processing proceeds to step S107. When the controller 21 determines that the processing is not the movement into the grouping frame GF (No in step S106), the processing proceeds to step S109 because the processing is the movement operation of the single frame not relevant to the grouping frame GF.

In step S107, the controller 21 determines whether the grouping frame GF is unset. When the controller 21 determines that the grouping frame GF is unset (Yes in step S107), the processing proceeds to step S108. When the controller 21 determines that the grouping frame GF is not unset (No in step S107), the processing proceeds to step S110 because the destination is decided due to the setting of the scroll message in the content frame to be operated.

In step S108, the controller 21 unsets the grouping frame GF. The scroll messages in the unset grouping frame GF are returned to the allocated scroll messages from the common scroll message. The processing proceeds to step S109. In step S109, the controller 21 moves the content frame to be operated to the specified position. When the movement of the content frame to be operated is completed, the processing is terminated.

In step S110, the controller 21 determines whether the scroll message in the content frame to be operated is changed to the common scroll message of the destination. When the controller 21 determines that the scroll message in the content frame to be operated is changed to the common scroll message (Yes in step S110), the processing proceeds to step S111. When the controller 21 determines that the scroll message in the content frame to be operated is not changed to the common scroll message (No in step S110), the processing proceeds to step S112 because the scroll message in the content frame to be operated is not changed to the common scroll message.

In step S111, the scroll message in the content frame to be operated is set to the common scroll message same as the scroll message of the grouping frame GF. The processing proceeds to step S109. In step S112, the content frame to be operated is moved to just behind the grouping frame GF. The processing is terminated.

Figure 24:
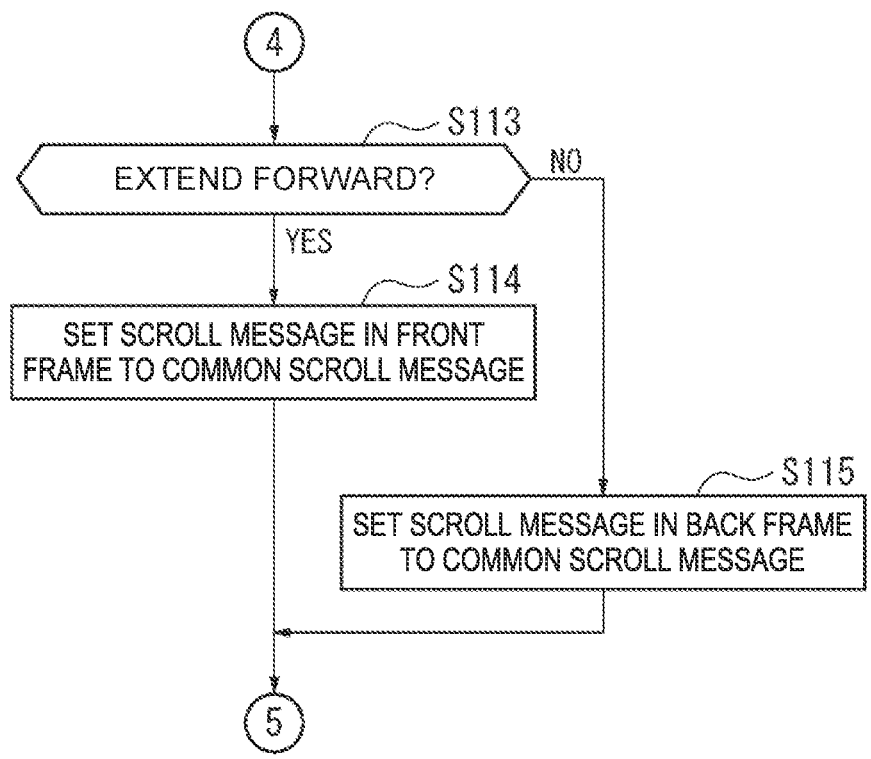
FIG. 24 is the rest of the flowchart illustrating the operations of the controller according to the first embodiment.

As illustrated in FIG. 24, in step S113, the controller 21 determines whether the content frame to be operated is extended forward. When the controller 21 determines that the content frame to be operated is extended forward (Yes in step S113), the processing proceeds to step S114. When the controller 21 determines that the content frame to be operated is not extended forward (No in step S113), the processing proceeds to step S115 because the content frame to be operated is extended backward.

In step S114, the controller 21 sets the scroll message in the front frame located in front of the content frame to be operated to the common scroll message. In step S115, the controller 21 sets the scroll message in the back frame located behind the content frame to be operated to the common scroll message. When the processing of step S114 or step S115 is completed, the processing is terminated.

Figure 25:
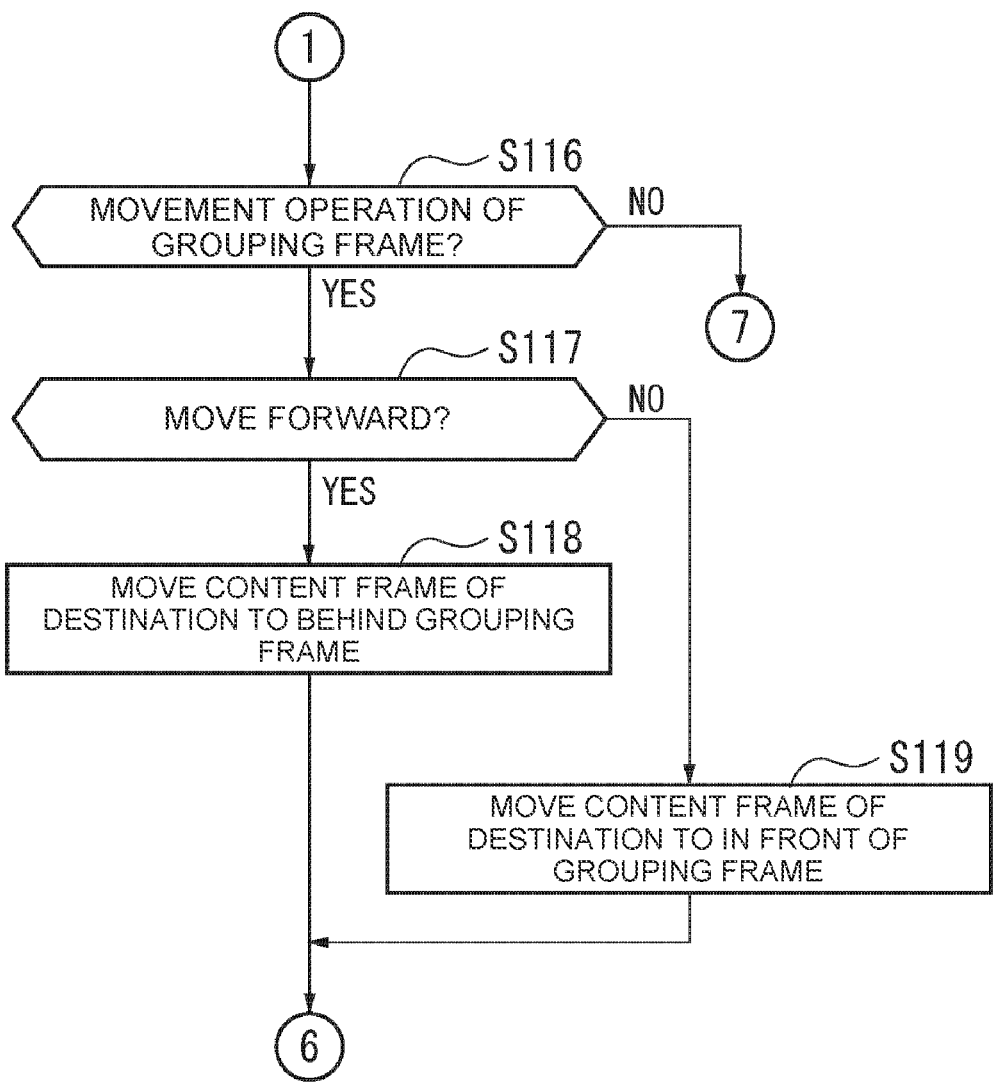
FIG. 25 is the rest of the flowchart illustrating the operations of the controller according to the first embodiment.

As illustrated in FIG. 25, in step S116, the controller 21 determines whether the processing is the movement operation of the grouping frame GF. When the controller 21 determines that the processing is the movement operation of the grouping frame GF (Yes in step S116), the processing proceeds to step S117. When the controller 21 determines that the processing is not the movement operation of the grouping frame GF (No in step S116), the processing proceeds to step S120 because the content frame to be operated is extended or reduced.

In step S117, the controller 21 determines whether the movement operation of the grouping frame GF is the forward movement. When the controller 21 determines that the movement operation of the grouping frame GF is the forward movement (Yes in step S117), the processing proceeds to step S118. When the controller 21 determines that the movement operation of the grouping frame GF is not the forward movement (No in step S117), the processing proceeds to step S119.

In step S118, the controller 21 moves the grouping frame GF forward. The content frame present in the destination is moved to just behind the grouping frame GF. In step S119, the controller 21 moves the grouping frame GF backward. The content frame present in the destination is moved to right in front of the grouping frame GF. When the processing of step S118 or step S119 is completed, the processing is terminated.

Figure 26:
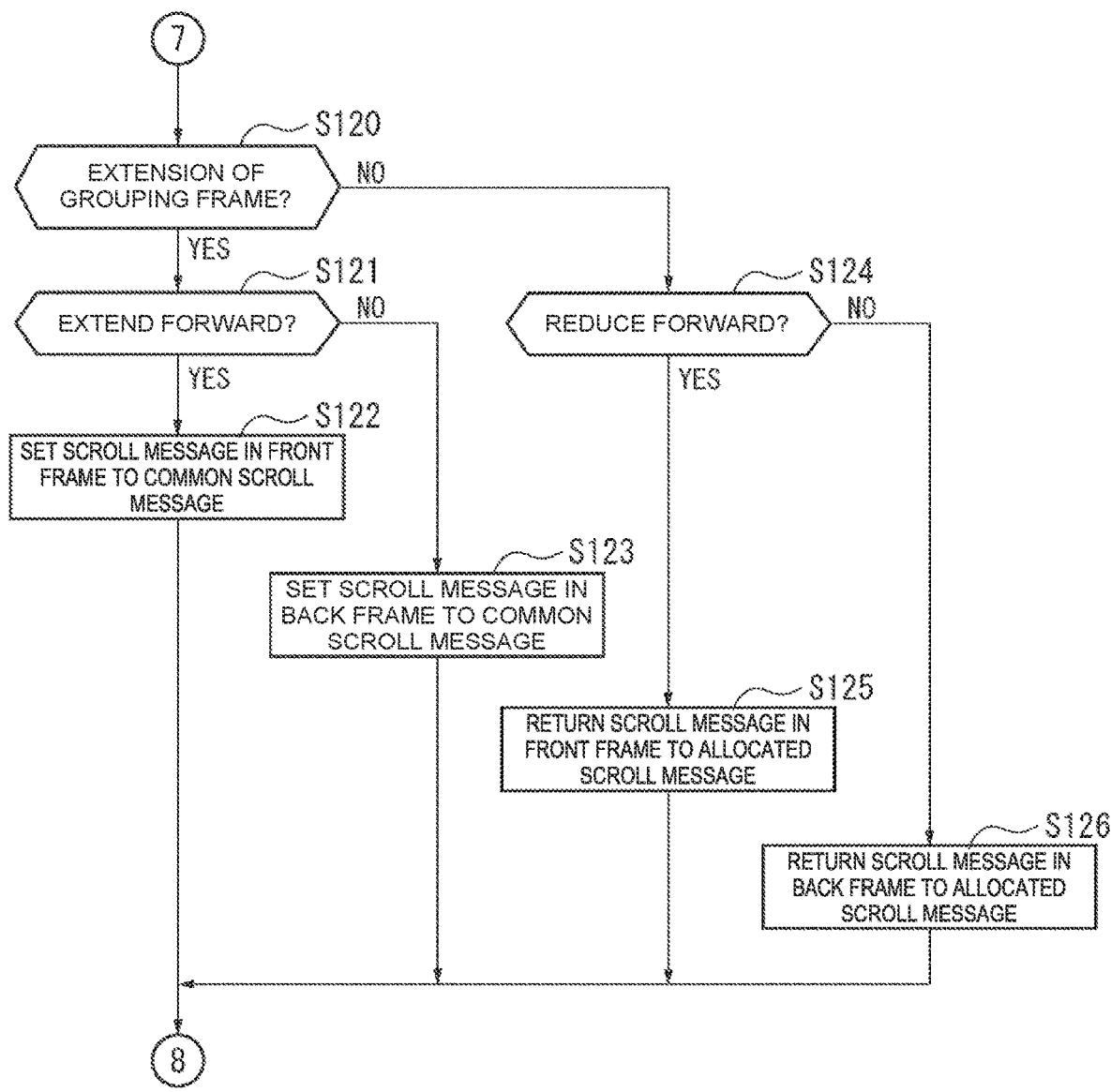
FIG. 26 is the rest of the flowchart illustrating the operations of the controller according to the first embodiment.

As illustrated in FIG. 26, in step S120, the controller 21 determines whether the processing is the extension of the grouping frame GF. When the controller 21 determines that the processing is the extension of the grouping frame GF (Yes in step S120), the processing proceeds to step S121. When the controller 21 determines that the processing is not the extension of the grouping frame GF (No in step S120), the processing proceeds to step S124 because the processing is the reduction of the grouping frame GF.

In step S121, the controller 21 determines whether the processing is the forward extension of the grouping frame GF. When the controller 21 determines that the processing is the forward extension of the grouping frame GF (Yes in step S121), the processing proceeds to step S122. When the controller 21 determines that the processing is not the forward extension of the grouping frame GF (No in step S121), the processing proceeds to step S123 because the processing is the backward extension.

In step S122, the controller 21 sets the scroll message in the front frame to the common scroll message same as the grouping frame GF. In step S123, the controller 21 sets the scroll message in the back frame to the common scroll message same as the grouping frame GF. When the processing of step S122 or step S123 is completed, the processing is terminated.

In step S124, the controller 21 determines whether the processing is the forward reduction of the grouping frame GF. When the controller 21 determines that the processing is the forward reduction of the grouping frame GF (Yes in step S124), the processing proceeds to step S125. When the controller 21 determines that the processing is not the forward reduction of the grouping frame GF (No in step S124), the processing proceeds to step S126 because the processing is the backward reduction.

In step S125, the controller 21 returns the scroll message in the front frame (right in front of the grouping frame GF) to the allocated scroll message after the reduction of the grouping frame GF. In step S126, the controller 21 returns the scroll message in the back frame (just behind the grouping frame GF) to the allocated scroll message after the reduction of the grouping frame GF. When the processing of step S125 or step S126 is completed, the processing is terminated.

The embodiment of the present disclosure has been described above with reference to the drawings. However, the present disclosure is not limited to the above-described embodiment and can be implemented in various modes without departing from the scope thereof. Moreover, various disclosures can be formed by appropriately combining a plurality of components disclosed in the above-described embodiment. For example, some components may be eliminated from the all components illustrated in the embodiment. The drawings schematically illustrate each of the components mainly for ease of understanding, and the number or the like of each of the illustrated components may be different from actual one for convenience of creation of the drawings. Furthermore, each of the components illustrated in the above-described embodiment is an example and is not particularly limited, and various changes can be made without substantially departing from the effects of the present disclosure.

(1) As illustrated with reference to FIG. 5, in the present embodiment, the playback of the scroll messages is controlled using the table T defining a display time, a size and an orientation of a scroll message display frame, one-byte/two-byte, a font, a speed, and the maximum number of characters to be displayed. However, the playback of the scroll messages may be controlled to conform to the playback times of the first piece of content and the second piece of content or the playback times of the pieces of content included in the grouping frame. For example, the ending time of the playback of the pieces of content may be aligned with the ending time of the playback of the scroll messages.

(2) As illustrated with reference to FIG. 1, in the present embodiment, the communication terminal is taken for example as the display data creation device. A device in which the content management device and the display data creation device are integrated may be used.

The invention claimed is:

1. A content management device including a processor that manages playback times of a plurality of pieces of content as visual content and manages scroll messages that are respectively set to the plurality of pieces of content and are played back simultaneously on a display with playback of the pieces of content, comprising:
   a content playback time adjacency determiner that determines, by the processor, whether playback times of a first piece of content and a second piece of content are adjacent;
   a common scroll message setting operation acceptor that accepts, by the processor, an operation to set a common scroll message common to the first piece of content and the second piece of content when the playback times of the first piece of content and the second piece of content are determined to be adjacent by the content playback time adjacency determiner; and
   a playback controller that continuously plays back, by the processor, the common scroll message, on the display, across the playback time of the first piece of content and the playback time of the second piece of content when the common scroll message is set to the first piece of content and the second piece of content,
   wherein, in the accepting, an operation by a user to specify a grouping range and group multiple pieces of content whose playback times are determined to be adjacent, among the plurality of pieces of content displayed on the display that displays, side by side, the plurality of pieces of content in chronological order according to a playback order, is accepted, and the common scroll message is set to the grouped multiple pieces of content.

2. The content management device according to claim 1, wherein, in a state before the common scroll message setting operation acceptor accepts the operation, by the processor, to set the common scroll message, a first scroll message is set to the first piece of content, and a second scroll message is set to the second piece of content, and the common scroll message setting operation acceptor accepts an operation, by the processor, to set one of the first scroll message and the second scroll message as the common scroll message to the first piece of content and the second piece of content.

3. The content management device according to claim 1, comprising:
   a content playback time change operation acceptor that accepts, by the processor, an operation to change the playback times of the plurality of pieces of content, wherein, in a state where the common scroll message is set to the first piece of content and the second piece of content, when a state where the playback times of the first piece of content and the second piece of content are not adjacent is determined by the content playback time adjacency determiner as a result of a change in the playback time of the first piece of content or the second piece of content, the common scroll message set to the first piece of content and the second piece of content is unset.

4. The content management device according to claim 1, comprising:
   a content playback order change operation acceptor that accepts, by the processor, operation to change a playback order of the plurality of pieces of content, wherein, in a state where the common scroll message is set to the first piece of content and the second piece of content, when an operation to change a playback order of the first piece of content and the second piece of content is accepted, the playback order of the first piece of content and the second piece of content is changed, and the common scroll message set to the first piece of content and the second piece of content is maintained.

5. The content management device according to claim 1, comprising:
   a content playback order change operation acceptor that accepts, by the processor, an operation to change a playback order of the plurality of pieces of content, wherein, in a state where the common scroll message is set to the first piece of content and the second piece of content, when an operation to insert a third piece of content in which a third scroll message is set between the first piece of content and the second piece of content is accepted, the third piece of content is inserted between the first piece of content and the second piece of content in a playback order, and the common scroll message set to the first piece of content and the second piece of content is unset.

6. The content management device according to claim 1, comprising:
   a content playback order change operation acceptor that accepts, by the processor, an operation to change a playback order of the plurality of pieces of content, wherein, in a state where the common scroll message is set to the first piece of content and the second piece of content, when an operation to insert a third piece of content in which a third scroll message is set between the first piece of content and the second piece of content is accepted, the third piece of content is inserted behind the second piece of content, and the common scroll message set to the first piece of content and the second piece of content is maintained.

7. The content management device according to claim 1, comprising:
   the display that displays, side by side, the plurality of pieces of content in chronological order according to a playback order, wherein the common scroll message setting operation acceptor accepts an operation to set the common scroll message respectively for multiple pieces of content whose playback times are determined to be adjacent, among the plurality of pieces of content displayed on the display, and sets the common scroll message to the multiple pieces of content accepted with respect to which the operation to set the common scroll message is accepted.

8. A content management method for managing playback times of a plurality of pieces of content as visual content and managing scroll messages that are respectively set to the plurality of pieces of content and are played back simultaneously on a display with playback of the pieces of content, comprising:

determining whether playback times of a first piece of content and a second piece of content are adjacent;

accepting an operation to set a common scroll message common to the first piece of content and the second piece of content when the playback times of the first piece of content and the second piece of content are determined to be adjacent in the determining; and continuously playing back the common scroll message, on the display, across the playback time of the first piece of content and the playback time of the second piece of content when the common scroll message is set to the first piece of content and the second piece of content, wherein, in the accepting, an operation by a user to specify a grouping range and group multiple pieces of content whose playback times are determined to be adjacent, among the plurality of pieces of content displayed on the display that displays, side by side, the plurality of pieces of content in chronological order according to a playback order, is accepted, and the common scroll message is set to the grouped multiple pieces of content.

9. The content management method according to claim 8, wherein, in a state before the operation to set the common scroll message is accepted in the accepting, a first scroll message is set to the first piece of content, and a second scroll message is set to the second piece of content, and, in the accepting, an operation to set one of the first scroll message and the second scroll message as the common scroll message is accepted with respect to the first piece of content and the second piece of content.

10. The content management method according to claim 8, comprising:

accepting an operation to change the playback times of the plurality of pieces of content, wherein, in a state where the common scroll message is set to the first piece of content and the second piece of content, when a state where the playback times of the first piece of content and the second piece of content are not adjacent is determined by the determining as a result of a change in the playback time of the first piece of content or the second piece of content, the common scroll message set to the first piece of content and the second piece of content is unset.

11. The content management method according to claim 8, comprising:

accepting an operation to change a playback order of the plurality of pieces of content, wherein, in a state where the common scroll message is set to the first piece of content and the second piece of content, when an operation to change a playback order of the first piece of content and the second piece of content is accepted, the playback order of the first piece of content and the second piece of content is changed, and the common scroll message set to the first piece of content and the second piece of content is maintained.

12. The content management method according to claim 8, comprising:

accepting an operation to change a playback order of the plurality of pieces of content, wherein, in a state where the common scroll message is set to the first piece of content and the second piece of content, when an operation to insert a third piece of content in which a third scroll message is set between the first piece of content and the second piece of content is accepted, the third piece of content is inserted between the first piece of content and the second piece of content in a playback order, and the common scroll message set to the first piece of content and the second piece of content is unset.

13. The content management method according to claim 8, comprising:

accepting an operation to change a playback order of the plurality of pieces of content, wherein, in a state where the common scroll message is set to the first piece of content and the second piece of content, when an operation to insert a third piece of content in which a third scroll message is set between the first piece of content and the second piece of content is accepted, the third piece of content is inserted behind the second piece of content, and the common scroll message set to the first piece of content and the second piece of content is maintained.

14. The content management method according to claim 8, wherein, in the accepting, an operation to set the common scroll message respectively for multiple pieces of content whose playback times are determined to be adjacent, among the plurality of pieces of content displayed on the display that displays, side by side, the plurality of pieces of content in chronological order according to a playback order, is accepted, and the common scroll message is set to the multiple pieces of content that have accepted the operation to set the common scroll message.

15. A non-transitory computer-readable recording medium storing a content management program for causing a computer to execute processing for managing playback times of a plurality of pieces of content as visual content and managing scroll messages that are respectively set to the plurality of pieces of content and are played back simultaneously on a display with playback of the pieces of content, the processing comprising:

determining whether playback times of a first piece of content and a second piece of content are adjacent;

accepting an operation to set a common scroll message common to the first piece of content and the second piece of content when the playback times of the first piece of content and the second piece of content are determined to be adjacent in the determining; and continuously playing back the common scroll message, on the display, across the playback time of the first piece of content and the playback time of the second piece of content when the common scroll message is set to the first piece of content and the second piece of content, wherein, in the accepting, an operation by a user to specify a grouping range and group multiple pieces of content whose playback times are determined to be adjacent, among the plurality of pieces of content displayed on the display that displays, side by side, the plurality of pieces of content in chronological order according to a playback order, is accepted, and the common scroll message is set to the grouped multiple pieces of content.

* * * * *